United States Patent
Souma et al.

(10) Patent No.: US 8,786,956 B2
(45) Date of Patent: Jul. 22, 2014

(54) ZOOM LENS SYSTEM, IMAGING OPTICAL DEVICE, AND DIGITAL APPLIANCE

(71) Applicants: Yoshihito Souma, Osaka (JP); Yasushi Yamamoto, Kishiwada (JP)

(72) Inventors: Yoshihito Souma, Osaka (JP); Yasushi Yamamoto, Kishiwada (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/773,111

(22) Filed: Feb. 21, 2013

(65) Prior Publication Data

US 2013/0215320 A1 Aug. 22, 2013

(30) Foreign Application Priority Data

Feb. 21, 2012 (JP) .................................. 2012-034920

(51) Int. Cl.
*G02B 15/14* (2006.01)
(52) U.S. Cl.
USPC ............................ 359/680; 359/683; 359/686

(58) Field of Classification Search
USPC .................................. 359/680–682, 683, 686
See application file for complete search history.

(56) References Cited

U.S. PATENT DOCUMENTS

| 7,102,829 | B2 * | 9/2006 | Nishimura | 359/686 |
|---|---|---|---|---|
| 7,508,594 | B2 * | 3/2009 | Saori | 359/686 |
| 2010/0188755 | A1 * | 7/2010 | Shibata | |
| 2010/0295595 | A1 | 11/2010 | Koutsoures | |

FOREIGN PATENT DOCUMENTS

| JP | 2010-250233 | 11/2010 |
|---|---|---|
| JP | 2011-257776 | 12/2011 |

* cited by examiner

*Primary Examiner* — Scott J Sugarman
(74) *Attorney, Agent, or Firm* — Cozen O'Connor

(57) ABSTRACT

A zoom lens system is composed of negative, positive, negative, and positive lens groups, of which at least the first to third move during zooming. During zooming from the wide-angle end to the telephoto end, the distance between the first and second lens groups decreases, the distance between the second and third lens groups varies, and the distance between the third and fourth lens groups increases. The conditional formulae $1.0 \le |f2/f1| \le 1.5$ and $2.0 \le |f4/f1| \le 5.0$ are fulfilled (f1, f2, and f4 representing the focal lengths of the first, second, and fourth lens groups).

20 Claims, 13 Drawing Sheets

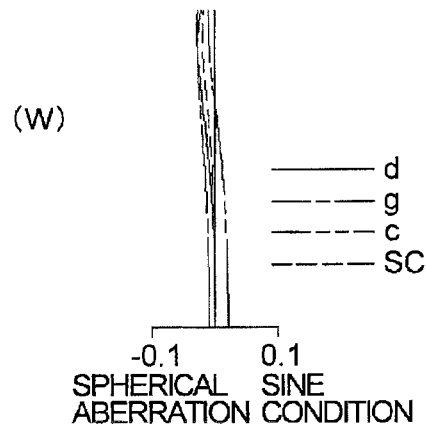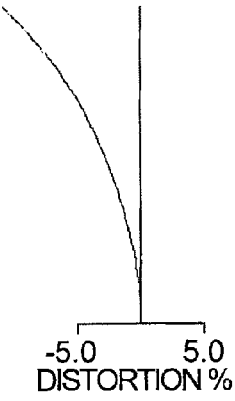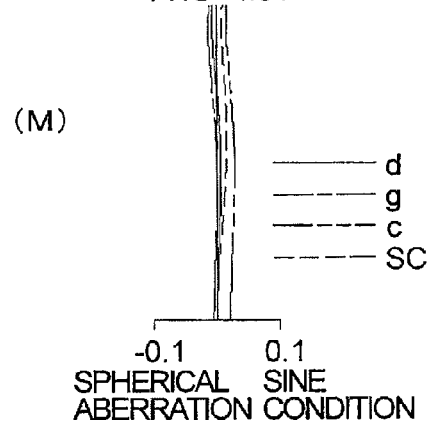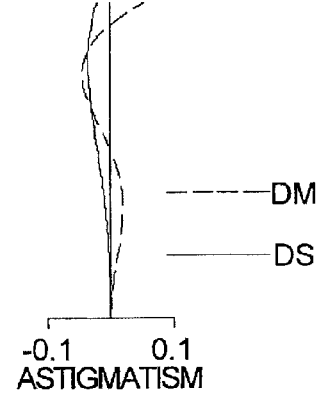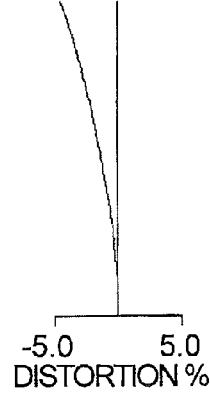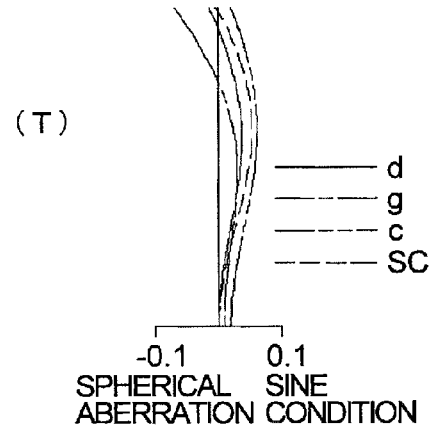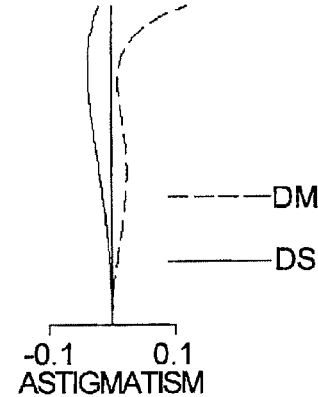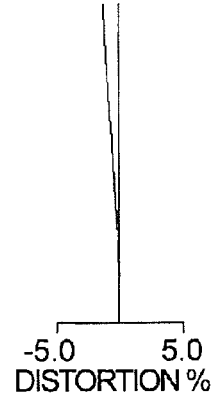

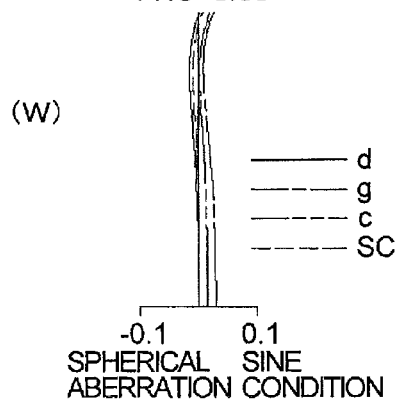
FIG.8A (EX2)
FNO=3.60
(W)
SPHERICAL SINE
ABERRATION CONDITION
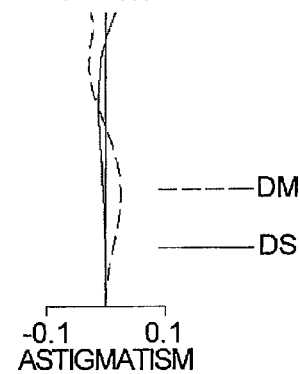
FIG.8B (EX2)
Y'=10.8
ASTIGMATISM
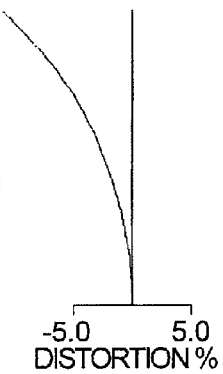
FIG.8C (EX2)
Y'=10.8
DISTORTION %
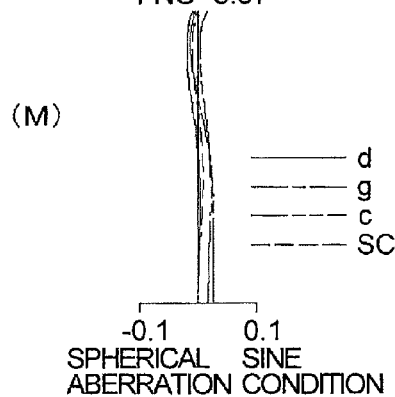
FIG.8D (EX2)
FNO=3.97
(M)
SPHERICAL SINE
ABERRATION CONDITION
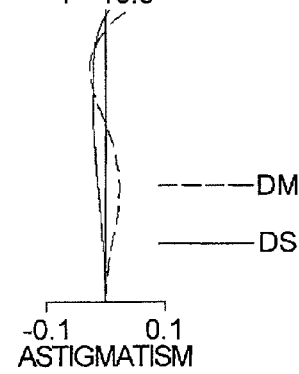
FIG.8E (EX2)
Y'=10.8
ASTIGMATISM
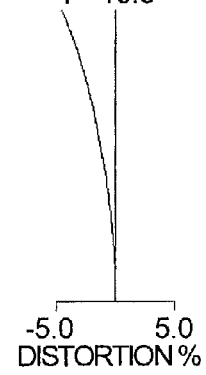
FIG.8F (EX2)
Y'=10.8
DISTORTION %
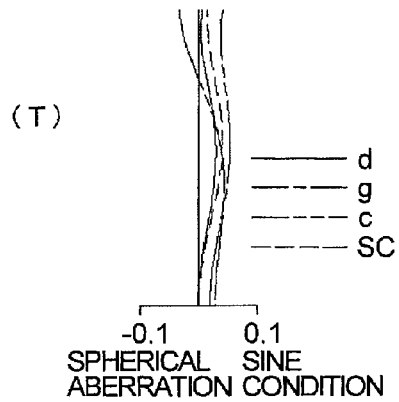
FIG.8G (EX2)
FNO=4.63
(T)
SPHERICAL SINE
ABERRATION CONDITION
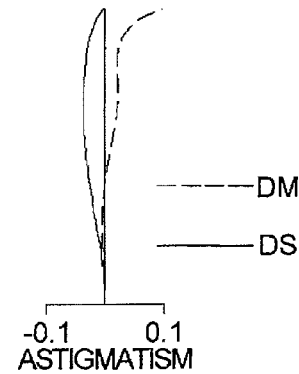
FIG.8H (EX2)
Y'=10.8
ASTIGMATISM
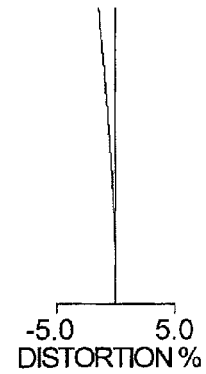
FIG.8I (EX2)
Y'=10.8
DISTORTION %

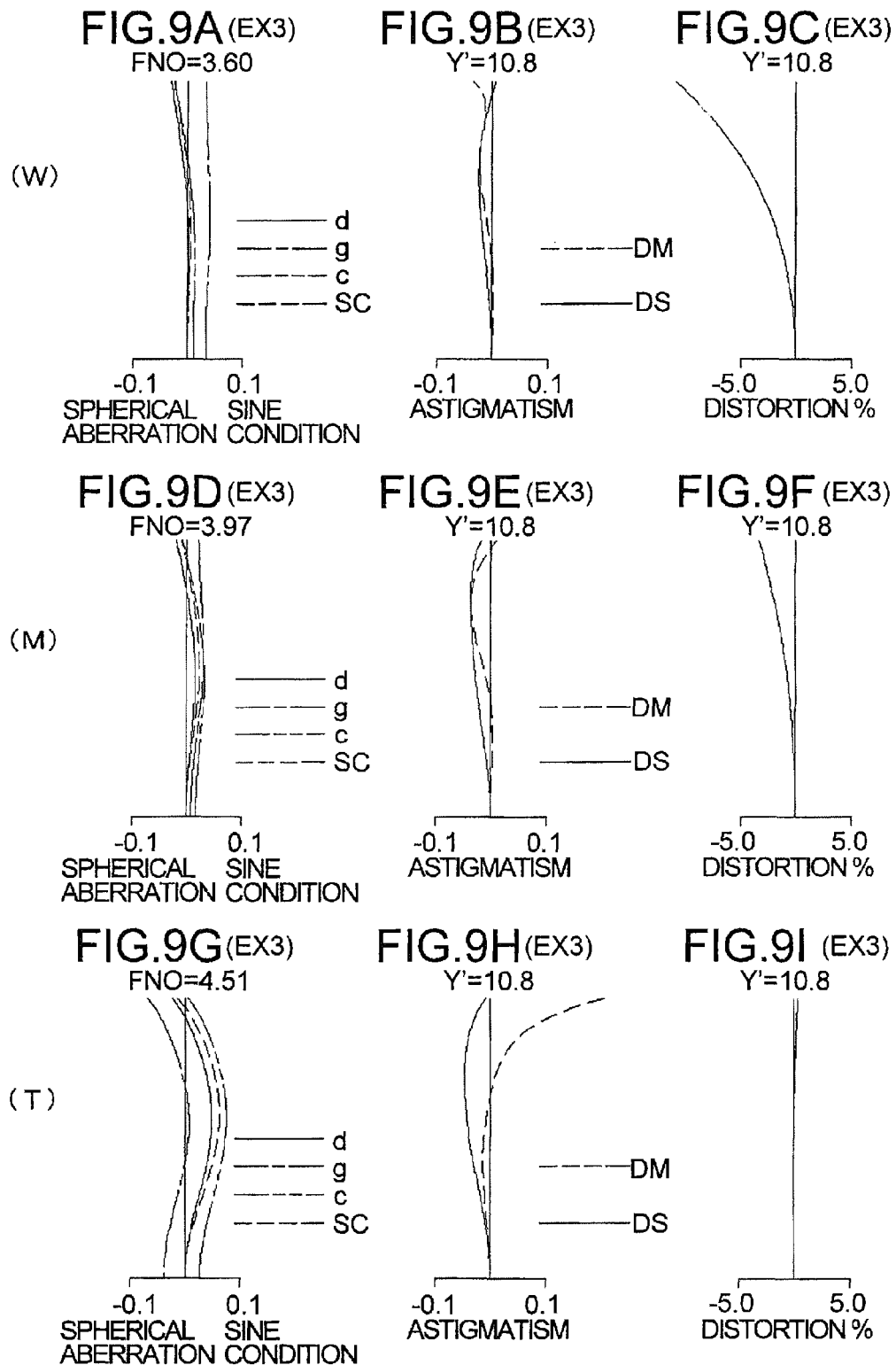

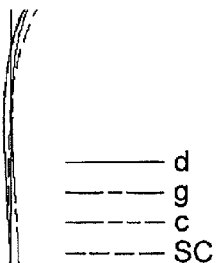
FIG.10A(EX4)
FNO=3.60
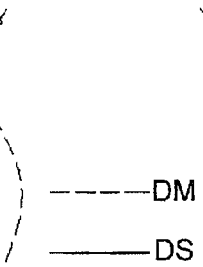
FIG.10B(EX4)
Y'=10.8
FIG.10C(EX4)
Y'=10.8
(W)
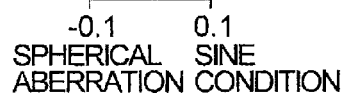
-0.1   0.1
SPHERICAL  SINE
ABERRATION CONDITION
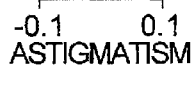
-0.1   0.1
ASTIGMATISM
-5.0   5.0
DISTORTION %
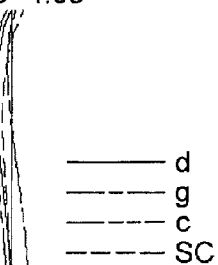
FIG.10D(EX4)
FNO=4.03
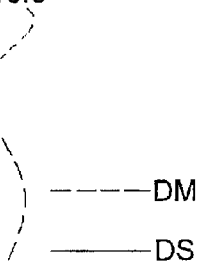
FIG.10E(EX4)
Y'=10.8
FIG.10F(EX4)
Y'=10.8
(M)
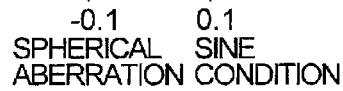
-0.1   0.1
SPHERICAL  SINE
ABERRATION CONDITION
-0.1   0.1
ASTIGMATISM
-5.0   5.0
DISTORTION %
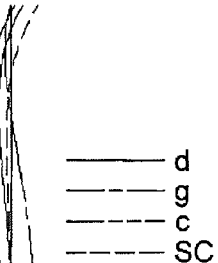
FIG.10G(EX4)
FNO=4.60
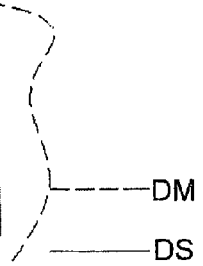
FIG.10H(EX4)
Y'=10.8
FIG.10I(EX4)
Y'=10.8
(T)
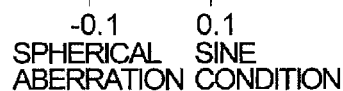
-0.1   0.1
SPHERICAL  SINE
ABERRATION CONDITION
-0.1   0.1
ASTIGMATISM
-5.0   5.0
DISTORTION %

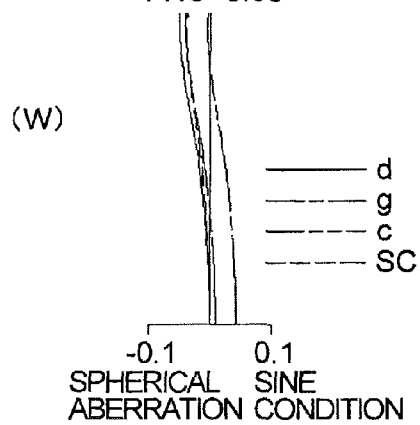
FIG.11A (EX5)
FNO=3.60
(W)
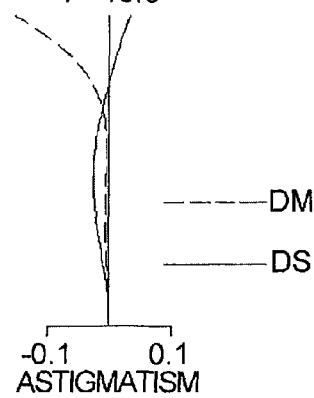
FIG.11B (EX5)
Y'=10.8
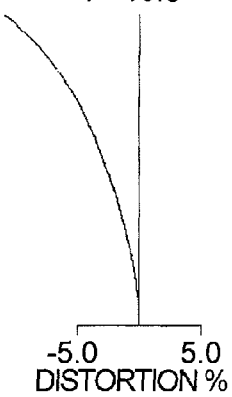
FIG.11C (EX5)
Y'=10.8
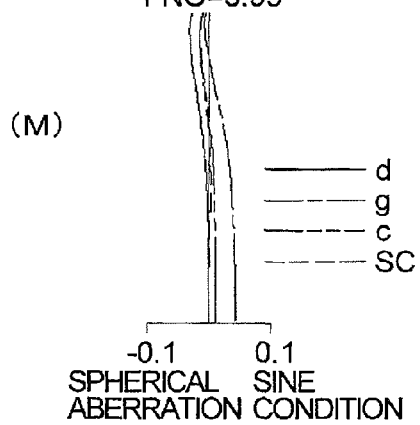
FIG.11D (EX5)
FNO=3.99
(M)
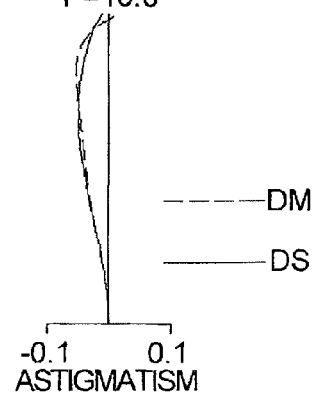
FIG.11E (EX5)
Y'=10.8
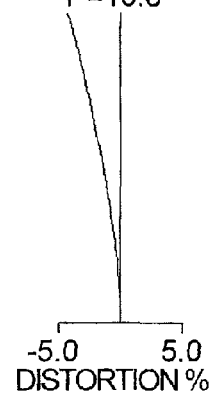
FIG.11F (EX5)
Y'=10.8
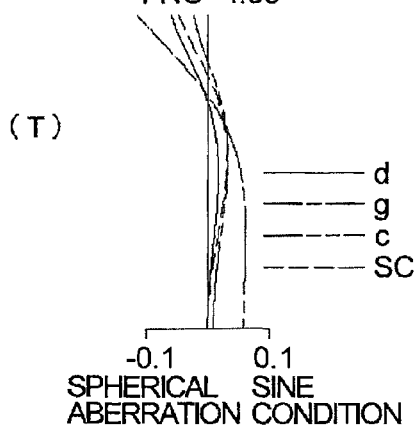
FIG.11G (EX5)
FNO=4.59
(T)
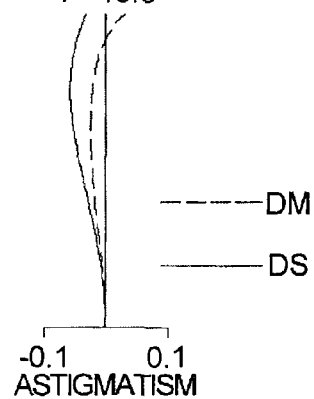
FIG.11H (EX5)
Y'=10.8
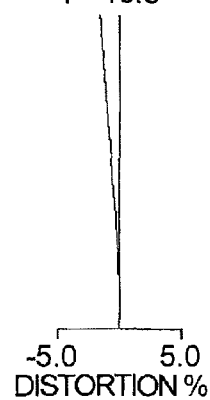
FIG.11I (EX5)
Y'=10.8

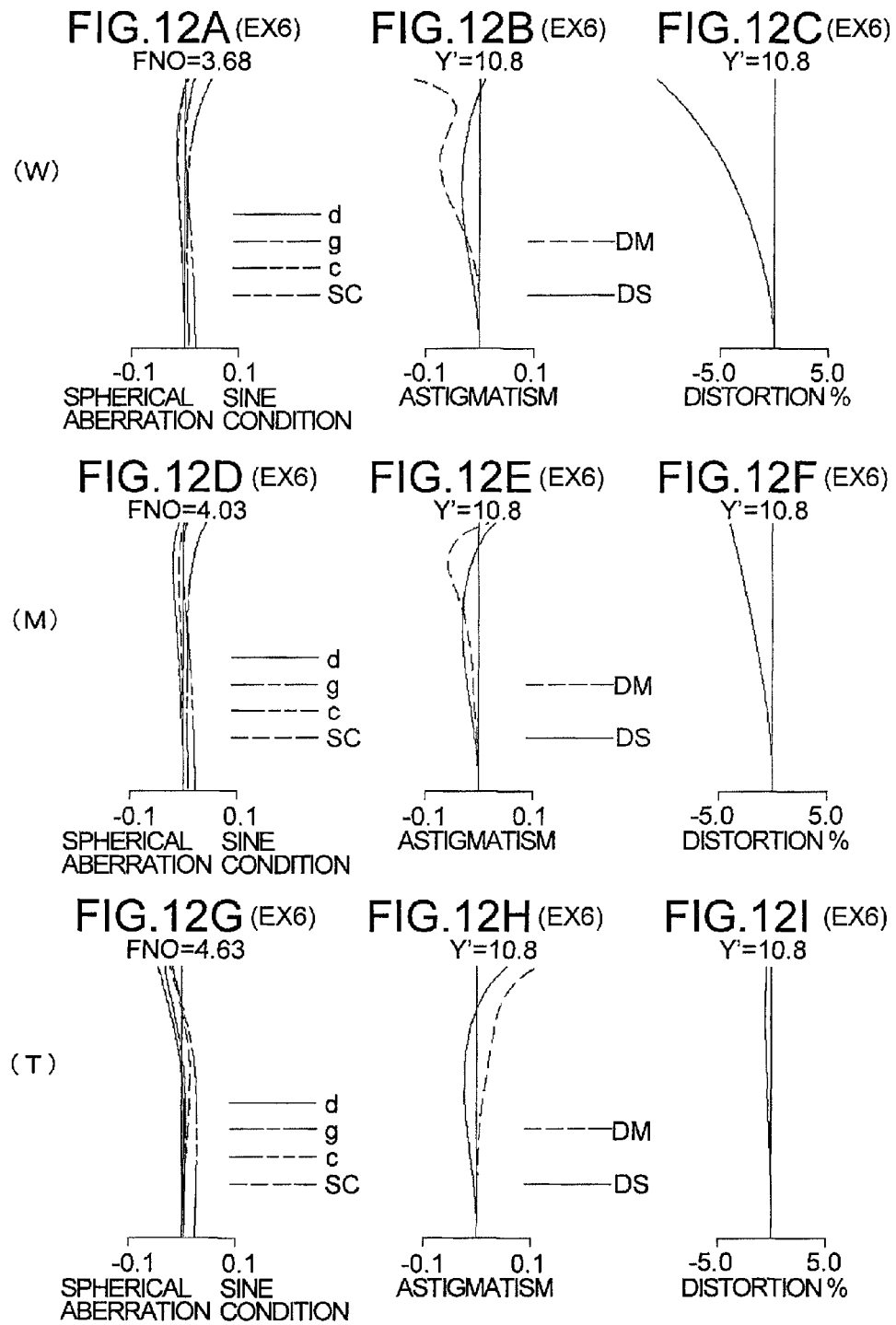

ZOOM LENS SYSTEM, IMAGING OPTICAL DEVICE, AND DIGITAL APPLIANCE

This application is based on Japanese Patent Application No. 2012-034920 filed on Feb. 21, 2012, the contents of which are hereby incorporated by reference.

BACKGROUND OF THE INVENTION

1. Field of the Invention

The present invention relates to a zoom lens system, an imaging optical device, and a digital appliance. More particularly, the present invention relates to a compact zoom lens system suitable for use in a digital appliance (for example, a interchangeable-lens digital camera) equipped with an image input capability for capturing an image of a subject with an image sensor, an imaging optical device that outputs in the form of an electrical signal the image of the subject captured with the zoom lens system and the image sensor, and a digital appliance incorporating such an imaging optical device so as to be equipped with an image input capability.

2. Description of Related Art

Patent Document 1 listed below proposes a zoom lens system that is compact enough to be suitable for use in a mirrorless exchangeable-lens camera or a video camera and that offers an angle of view of about 100 degrees (2ω) combined with a zoom ratio of about 2×. Proposed in Patent Document 1, however, is a two-group zoom lens system, which does not provide sufficient flexibility to secure flatness of the off-axial image plane over the entire zoom range and which thus leaves comparatively large curvature of field uncorrected.

By increasing the number of movable lens groups for zooming, it is possible to increase flexibility and thereby solve the above-mentioned problem in performance. For example, Patent Document 2 discloses a zoom type composed of four, namely negative, positive, negative, and positive, lens groups, wherein the distances between those lens groups vary during zooming. This four-group zoom type, compared with the two-group zoom type of Patent Document 1, provides more flexibility in securing image plane flatness over the entire zoom range.

Patent Document 1: Japanese Patent Application Publication No. 2010-250233
Patent Document 2: Japanese Patent Application Publication No. 2011-257776

The zoom lens system disclosed in Patent Document 2, however, is designed for single-lens reflect cameras, which require a long back focal length; accordingly, to obtain a high degree of retrofocus, a strong convergent power needs to be given, with the result that the fourth lens group, which contain a comparatively large number of lens elements, needs to be moved out greatly toward the object side for zooming to the telephoto end. Thus, this zoom lens system cannot be said to be compact enough for use where no swing-up mirror is needed as in a mirrorless interchangeable-lens camera or a video camera.

SUMMARY OF THE INVENTION

Devised against the background discussed above, the present invention aims to provide a zoom lens system that is compact enough to be suitable for use in a mirrorless interchangeable-lens camera or a video camera and that offers an angle of view (2ω) of about 100 degrees, satisfactory off-axial performance over the entire zoom range and a zoom ratio of about 2×, and to provide an imaging optical device and a digital appliance provided with such a zoom lens system.

To achieve the above aim, according to one aspect of the invention, a zoom lens system includes, from the object side, a first lens group having a negative optical power, a second lens group having a positive optical power, a third lens group having a negative optical power, and a fourth lens group having a positive optical power, and achieves zooming by varying the distances between the lens groups. Here, during zooming, at least the first to third lens groups move individually; during zooming from the wide-angle end to the telephoto end, the distance between the first and second lens groups decreases, the distance between the second and third lens groups varies, and the distance between the third and fourth lens groups increases; and Conditional Formulae (1) and (2) below are fulfilled:

$$1.0 \leq |f2/f1| \leq 1.5 \quad (1)$$

$$2.0 \leq |f4/f1| \leq 5.0 \quad (2)$$

where
  f1 represents the focal length of the first lens group;
  f2 represents the focal length of the second lens group; and
  f4 represents the focal length of the fourth lens group.

According to another aspect of the present invention, an imaging optical device includes an image sensor for converting an optical image formed on a light-sensing surface into an electrical signal and a zoom lens system provided such that an optical image of a subject is formed on the light-sensing surface of the image sensor. Here, the zoom lens system is constructed as described above.

According to yet another aspect of the present invention, a digital appliance includes an imaging optical device so as to be additionally equipped with at least one of a function of shooting a still image of a subject and a function of shooting a moving image of a subject. Here, the imaging optical device includes: an image sensor for converting an optical image formed on a light-sensing surface into an electrical signal; and a zoom lens system provided such that an optical image of a subject is formed on the light-sensing surface of the image sensor. Moreover, the zoom lens system is constructed as described above.

BRIEF DESCRIPTION OF THE DRAWINGS

FIGS. 7A to 7I are aberration diagrams of Example 1;
FIGS. 8A to 8I are aberration diagrams of Example 2;
FIGS. 9A to 9I are aberration diagrams of Example 3;
FIGS. 10A to 10I are aberration diagrams of Example 4;
FIGS. 11A to 11I are aberration diagrams of Example 5;
FIGS. 12A to 12I are aberration diagrams of Example 6.

DETAILED DESCRIPTION OF PREFERRED EMBODIMENTS

Figure 1:
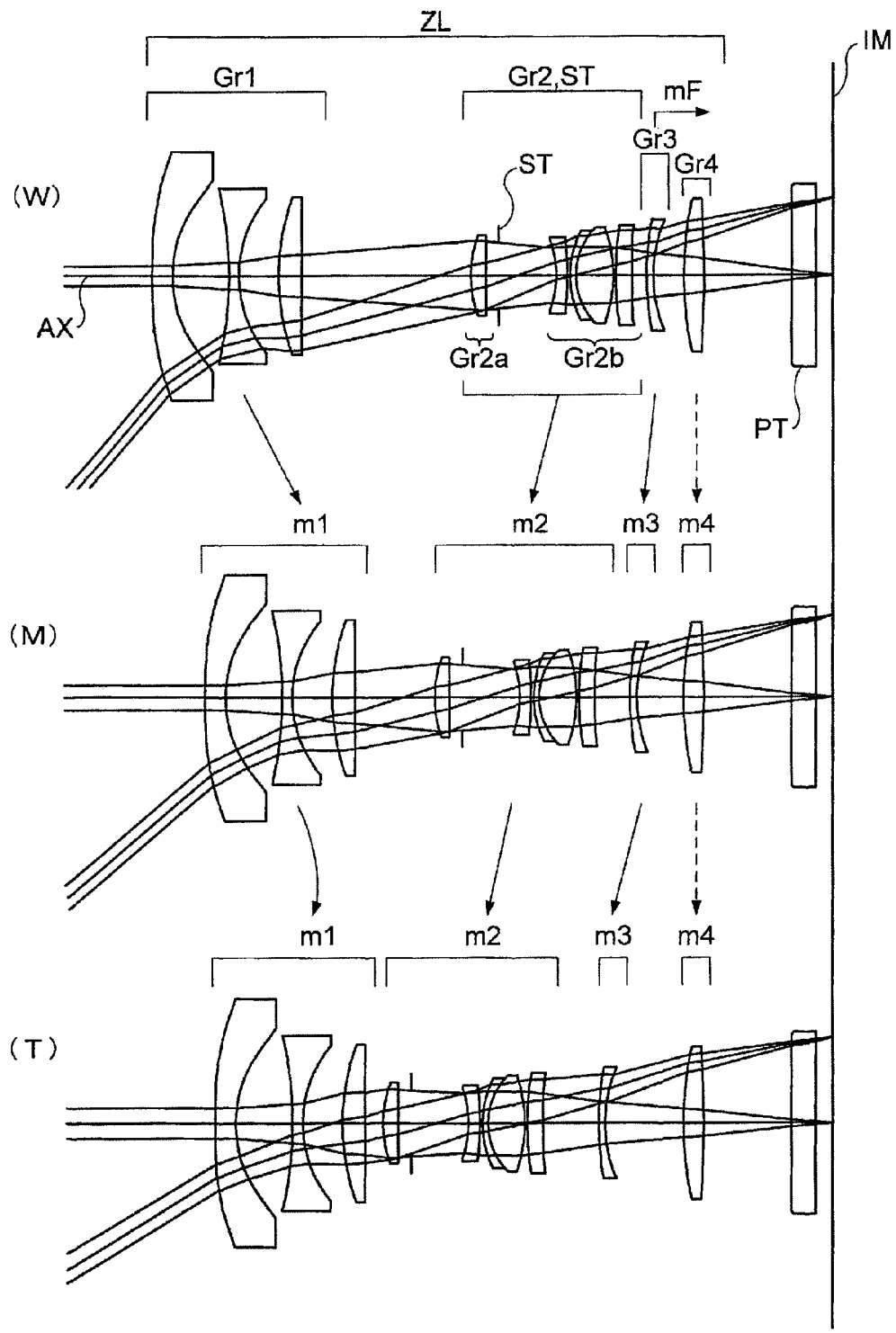
FIG. 1 is an optical arrangement diagram of the first embodiment (Example 1)
Figure 2:
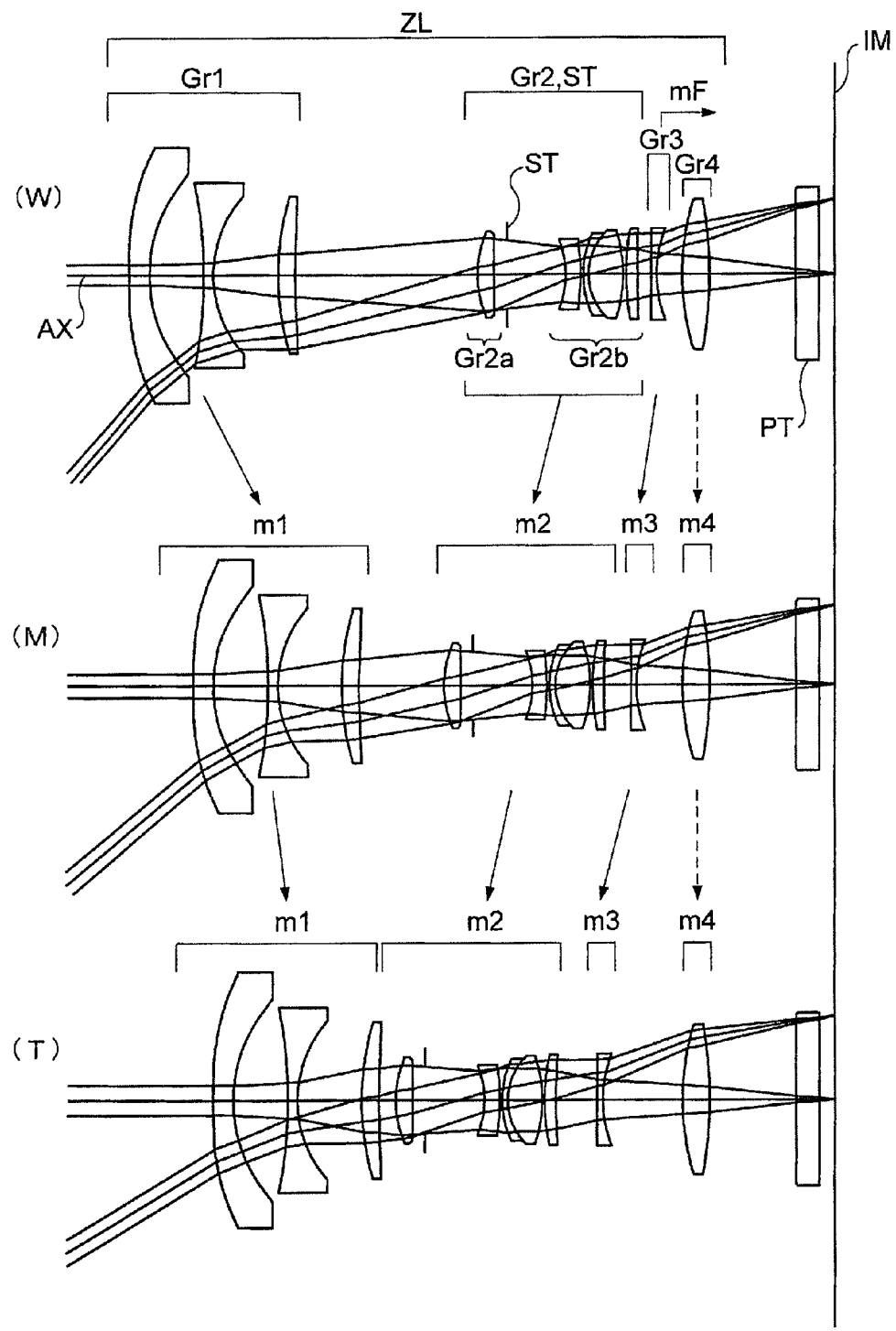
FIG. 2 is an optical arrangement diagram of the second embodiment (Example 2)
Figure 3:
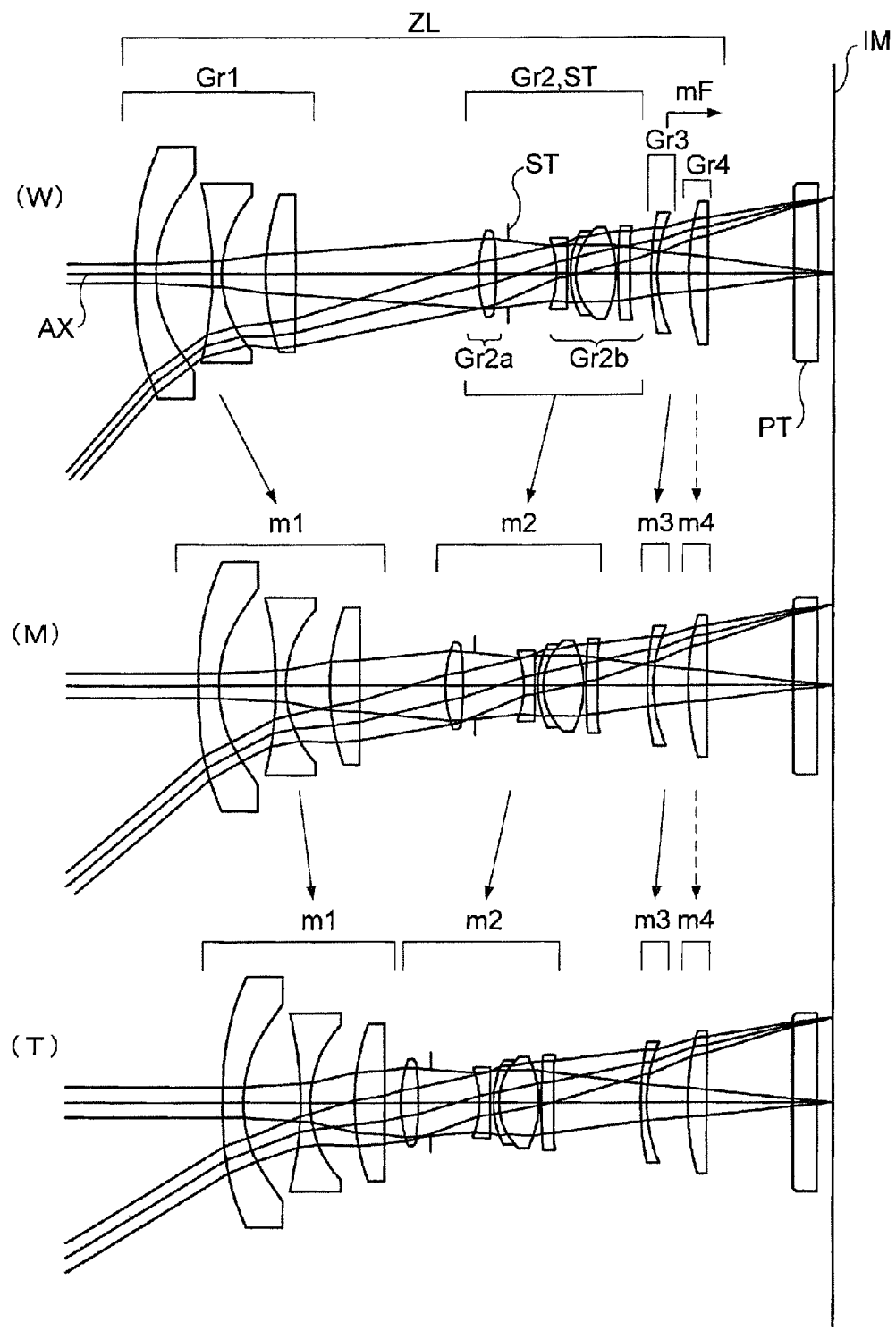
FIG. 3 is an optical arrangement diagram of the third embodiment (Example 3)
Figure 4:
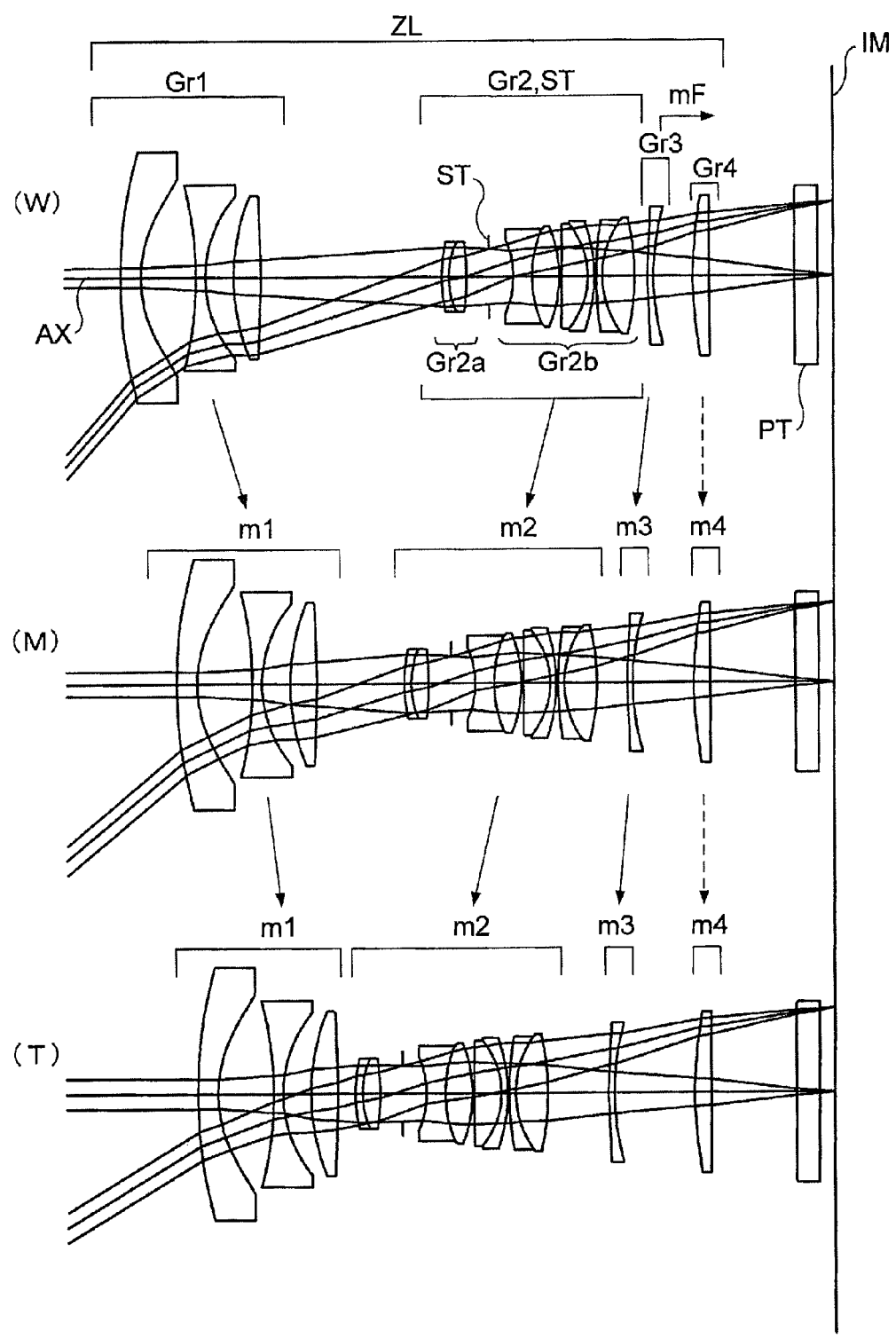
FIG. 4 is an optical arrangement diagram of the fourth embodiment (Example 4)
Figure 5:
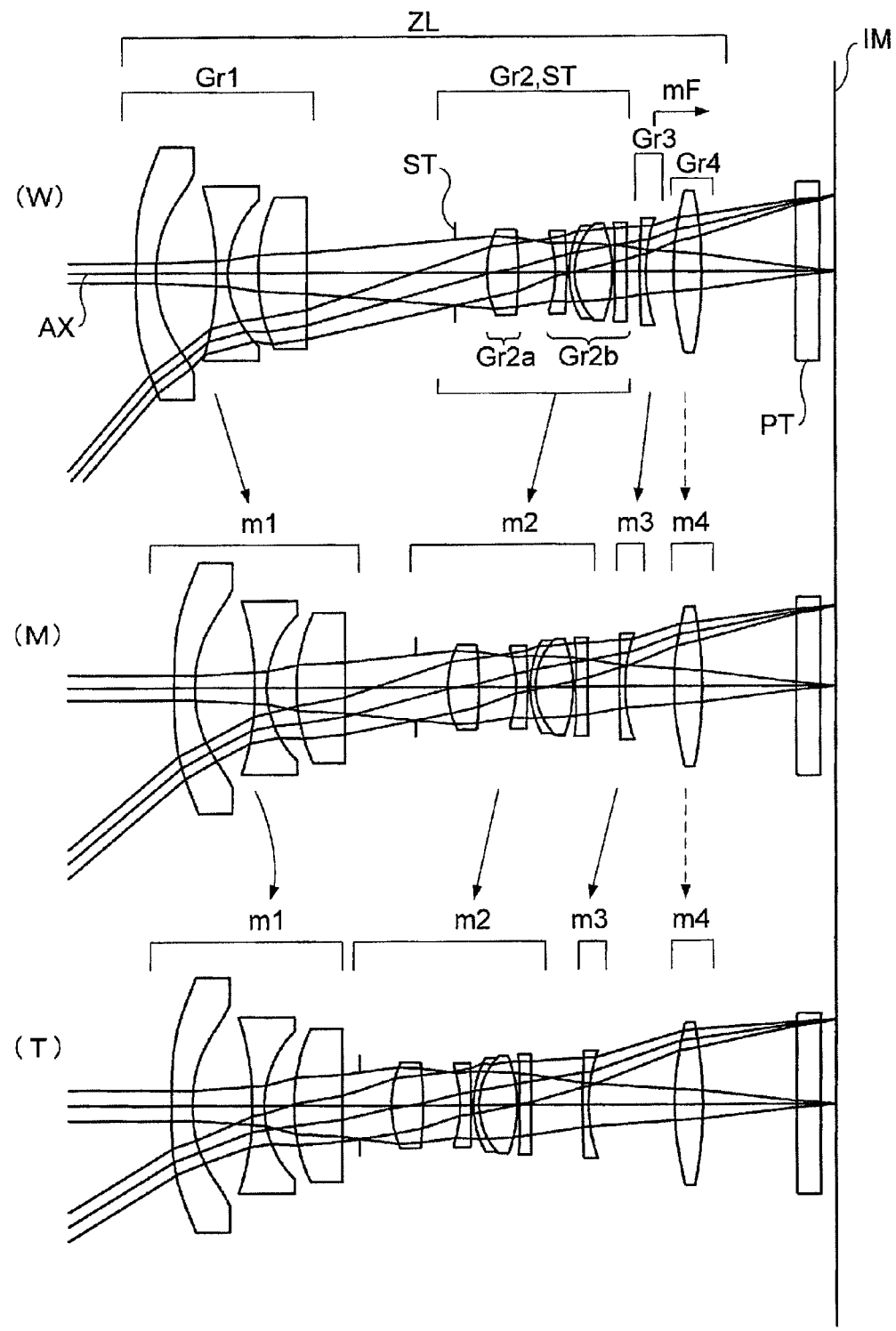
FIG. 5 is an optical arrangement diagram of the fifth embodiment (Example 5)
Figure 6:
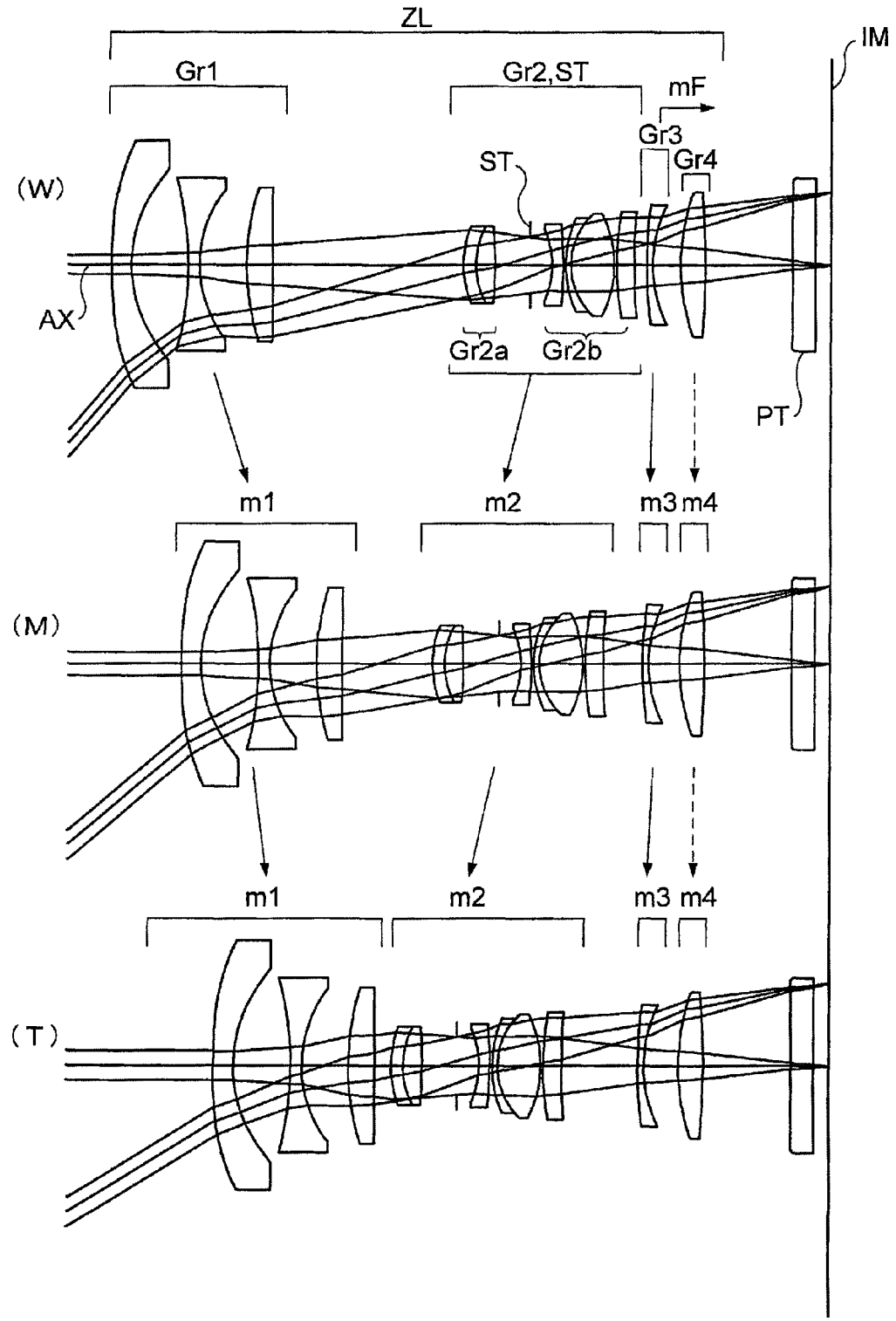
FIG. 6 is an optical arrangement diagram of the sixth embodiment (Example 6)

Hereinafter, zoom lens systems, imaging optical devices, and digital appliances according to the present invention will be described. A zoom lens system according to the present invention is a zoom lens system that is composed of, from the object side, a first lens group having a negative optical power, a second lens group having a positive optical power, a third lens group having a negative optical power, and a fourth lens group having a positive optical power and that achieves zooming by varying the distances between those lens groups. Here, during zooming, at least the first to third lens groups move individually. During zooming from the wide-angle end to the telephoto end, the distance between the first and second lens groups decreases, the distance between the second and third lens groups varies, and the distance between the third and fourth lens groups increases. Moreover, Conditional Formulae (1) an (2) below are fulfilled. (It should be noted that an optical power is a quantity defined as the reciprocal of a focal length, and that the magnitude of an optical power corresponds to the magnitude of the absolute value of the optical power.)

$$1.0 \le |f2/f1| \le 1.5 \quad (1)$$

$$2.0 \le |f4/f1| \le 5.0 \quad (2)$$

where
f1 represents the focal length of the first lens group;
f2 represents the focal length of the second lens group; and
f4 represents the focal length of the fourth lens group.

Conditional Formulae (1) and (2) define a proper power balance of the second and fourth lens groups, respectively, relative to the first lens group. Below the lower limit of Conditional Formula (1) or (2), an increased Petzval sum results, and the off-axial image plane curves to the under side, making it difficult to secure image plane flatness. On the other hand, above the upper limit of Conditional Formula (1) or (2), too small a Petzval sum results, and while the Petzval image plane itself is flat, it is difficult to strike a balance with spherical aberration and off-axial astigmatism. As a result, it is difficult to secure flatness of the optimal image plane. Moreover, reducing the optical powers of the second and fourth lens groups makes the optical system larger. Under these conditions, maintaining compactness tends to increase the optical power of the first lens group, and this makes it difficult to correct distortion, astigmatism, and coma at large image heights.

As a means of controlling the Petzval sum other than by controlling the optical powers of lens groups, it is also possible to control the refractive indices of lens materials and the lens element arrangement within lens groups. However, in lens systems covering a wide-angle range as targeted by the present invention, it is equally important to correct lateral chromatic aberration, and thus conceding flexibility in the choice of glass materials to correction of the Petzval sum makes it difficult to correct lateral chromatic aberration. More specifically, from the perspective of correcting lateral chromatic aberration, while high-power positive lens elements are formed of low-refractive-index, low-dispersion materials having "lang" anomalous dispersion, and high-power negative lens elements are formed of high-refractive-index, medium to high-dispersion "kurz" anomalous dispersion, and this tends to result in a large Petzval sum. Designing the lens element arrangement within lens groups with emphasis placed on correction of the Petzval sum results in an undesirable result of lower flexibility in correction of spherical aberration, coma, and stigmatism. Out of these considerations, by fulfilling Conditional Formulae (1) and (2), it is possible, while minimizing the effect of reduced flexibility in lens element arrangement within lens groups and in the choice of lens materials on correction of other aberrations, to obtain the desired image plane flatness.

With the distinctive construction described above, it is possible to secure off-axial image plane flatness the like, and thus it is possible to realize a zoom lens system, and an imaging optical device provided therewith, that is so compact as to be suitable for use in mirrorless interchangeable-lens cameras and video cameras, that has an angle of view (2ω) of about 100 degrees, that offers satisfactory off-axial performance over the entire zoom range, and that has a zoom ratio of about 2×. By incorporating such a zoom lens system or imaging optical device in a digital appliance such as a digital camera, it is possible to add a high-performance image input capability to the digital appliance in a lightweight and compact fashion. This contributes to making the digital appliance compact, low-cost, high-performance, versatile, and otherwise improving it. A zoom lens system according to the present invention is, from the perspective of shortening the back focal length, suitable as an interchangeable lens for mirrorless digital cameras and video cameras, and this makes it possible to realize a compact interchangeable lens that can be conveniently carried around. Conditions and other features for obtaining those benefits with a good balance, and for achieving still higher optical performance and further compactness, will be described below.

It is further preferable that Conditional Formula (1a) below be fulfilled.

$$1.1 \le |f2/f1| \le 1.4 \quad (1a)$$

This Conditional Formula (1a) defines, within the conditional range defined by Conditional Formula (1) noted above, a further preferable conditional range out of the above-mentioned and other considerations. Accordingly, by fulfilling preferably Conditional Formula (1a), it is possible to obtain more of the benefits mentioned above.

It is further preferable that Conditional Formula (2a) below be fulfilled.

$$2.4 \le |f4/f1| \le 4.5 \quad (2a)$$

This Conditional Formula (2a) defines, within the conditional range defined by Conditional Formula (2) noted above, a further preferable conditional range out of the above-mentioned and other considerations. Accordingly, by fulfilling preferably Conditional Formula (2a), it is possible to obtain more of the benefits mentioned above.

It is preferable that an aperture stop that moves together with the second lens group during zooming be provided to the object side of or within the second lens group, that a cemented lens element formed by cementing together a negative lens element having a strong concave surface on the image side and a biconvex lens element be arranged within the second lens group, to the image side of the aperture stop, and that the material of the biconvex lens element fulfill Conditional Formula (3) below.

$$\Delta PgF \ge 0.015 \quad (3)$$

where
$\Delta PgF = PgF - \alpha gF - \beta gF \times vd$;
$PgF = (ng - nF)/(nF - nC)$;
ng represents the refractive index for the g-line;
nF represents the refractive index for the F-line;
nC represents the refractive index for the C-line;
$\alpha gF = 0.6483$;

βgF=−0.0018; and vd represents the Abbe number of the lens material.

In correction of lateral chromatic aberration in a zoom lens system covering a wide-angle range, it is important to reduce the secondary spectrum at the wide-angle end, where it remains in the positive direction both on the short-wavelength and long-wavelength sides. By arranging within the second lens group, to the image-plane side of the aperture stop, a positive lens element formed of a material having an anomalous dispersion ΔPgF that fulfills Conditional Formula (3), it is possible to effectively reduce the secondary spectrum of lateral chromatic aberration, and simultaneously to reduce the secondary spectrum of axial chromatic aberration.

To reinforce the above-mentioned effect of correcting lateral chromatic aberration, it is effective to increase the power of a positive lens element; however, since a low-dispersion material having an anomalous dispersion ΔPgF that fulfills Conditional Formula (3) generally has a low refractive index, a sharp curvature then needs to be given. This increases the sensitivity to eccentric aberrations that result from an error in lens fabrication or from eccentricity arising during assembly. Thus, it is preferable that the positive lens element be a cemented lens element having a negative lens element cemented to it so as to have a sharp curvature at the cemented surface for a higher effect of correcting chromatic aberration.

It is preferable that the materials of the lens elements composing the cemented lens element fulfill Conditional Formula (4) below.

$$nn-np \geq 0.25 \quad (4)$$

where nn represents the refractive index of the negative lens element for the d-line; and np represents the refractive index of the biconvex lens element for the d-line.

As mentioned above, by giving the cemented surface a sharp curvature, it is possible to produce high-order astigmatism at the cemented surface and thereby obtain an effect of making it easy to control image plane flatness at large image heights. By additionally fulfilling Conditional Formula (4), it is possible to increase the amount of aberration produced at the cemented surface and thereby enhance the above-mentioned effect.

It is preferable that a negative meniscus lens element that fulfills Conditional Formula (5) below be arranged in the third lens group.

$$1.0 \leq (R1+R2)/(R1-R2) \leq 3.5 \quad (5)$$

where

R1 represents the radius of curvature of the object-side surface of the negative meniscus lens element; and;

R2 represents the radius of curvature of the image-side surface of the negative meniscus lens element.

In a zoom lens system covering a wide-angle range, it is also important to correct distortion at the wide-angle end. By arranging in the third lens group, which is arranged to the image side of the aperture stop, a negative lens element that fulfills Conditional Formula (5), it is possible to produce large positive distortion and thereby cancel the negative distortion produced in the first lens group. Below the lower limit of Conditional Formula (5), it is not possible to sufficiently obtain the above-mentioned effect of correcting distortion. By contrast, above the upper limit of Conditional Formula (5), it is possible to enhance the effect of correcting distortion, but the lens produces too large positive astigmatism, making it difficult to secure image plane flatness.

It is preferable that focusing be achieved by moving the third lens group, and that Conditional Formula (6) below be fulfilled.

$$1.2 \leq \beta 3t \leq 4.0 \quad (6)$$

where

β3t represents the paraxial lateral magnification at the telephoto end.

By achieving focusing by moving the third lens group, which fulfills Conditional Formula (6), it is possible to obtain proper focusing sensitivity (the amount of displacement of the image plane per unit displacement of the focusing lens group). Below the lower limit of Conditional Formula (6), it is difficult to obtain sufficient focusing sensitivity; this necessitates a long focusing movement stroke and may make the optical system larger. In addition, it is then difficult to obtain satisfactory close-up performance. Above the upper limit of Conditional Formula (6), the focusing sensitivity is so high that the control of the focusing group requires a high-precision control means.

It is preferable that an aperture stop that moves together with the second lens group during zooming be provided to the object side of or within the second lens group, that the second lens group have at least one air gap inside, and that, when the second lens group is divided into two lens groups that are located to opposite sides of the largest air gap within the second lens group, with the object-side lens group referred to as the 2a-th lens group and the image-side lens group referred to as the 2b-th lens group, the 2a-th lens group have a positive optical power, the aperture stop be arranged to the object side of the 2b-th lens group, a surface concave to the object side be arranged at the most object-side position in the 2b-th lens group, and that Conditional Formula (7) below be fulfilled.

$$-5.0 \leq R2b/Ds \leq -1.0 \quad (7)$$

where

R2b represents the radius of curvature of the concave surface; and

Ds represents the distance from the aperture stop to the vertex of the concave surface along the optical axis.

The axial rays that have been converged by the 2a-th lens group then pass through the largest air gap within the second lens group, and meanwhile their ray heights decrease. By arranging there a divergent surface having a comparatively sharp curvature (specifically, the concave surface at the most object-side position in the 2b-th lens group), it is possible to produce large positive spherical aberration, and thereby to strike a balance with the negative spherical aberration produced at convergent surfaces within the second lens group, where a comparatively large number of convergent surfaces are arranged to produce the main converging effect throughout the entire optical system. In addition, with the divergent surface, which fulfills Conditional Formula (7), it is possible to suppress off-axial aberrations such as coma and astigmatism, and it is possible to give more independence to the control of spherical aberration. Below the lower limit of Conditional Formula (7), the above-mentioned effect of correcting spherical aberration is insufficient. Above the upper limit of Conditional Formula (7), increased coma and astigmatism may result.

It is preferable that Conditional Formula (8) below be fulfilled.

$$0.9 \leq f2a/f2 \leq 1.4 \quad (8)$$

where f2a represents the focal length of the 2a-th lens group; and f2 represents the focal length of the second lens group.

By fulfilling Conditional Formula (8) in addition to Conditional Formula (7), it is possible to further enhance the effect of the construction that fulfills Conditional Formula (7). Above the upper limit of Conditional Formula (8), the effect of converging axial rays in the 2a-th lens group is so weak that it is not possible to obtain a sufficient effect of correcting the above-mentioned spherical aberration produced at the divergent surface. Below the lower limit of Conditional Formula (8), whereas the effect of correcting the spherical aberration produced at the divergent surface in the 2b-th lens group is enhanced, the optical power of the 2a-th lens group is so high that the 2a-th lens group may produce increased spherical aberration and coma.

A zoom lens system according to the present invention is suitable for use as an imaging lens in digital appliances equipped with an image input capability (for example, digital cameras), and by combining it with an image sensor or the like, it is possible to build an imaging optical device which optically captures an image of a subject and outputs it in the form of an electrical signal. An imaging optical device is an optical device which serves as a main component of a camera used for the shooting of still and moving images, and incorporates, for example, from the object side (that is, from the subject side), a zoom lens system for forming an optical image of an object and an image sensor for converting the optical image formed by the zoom lens system into an electrical signal. The zoom lens system having the distinctive construction described previously is arranged such that the optical image of the subject is formed on the light-sensing surface (that is, imaging surface) of the image sensor, and this makes it possible to realize a compact, low-cost, and high-performance imaging optical device and a digital appliance provided with it.

Examples of digital appliances equipped with an image input capability include: cameras such as digital cameras, video cameras, surveillance cameras, vehicle-mounted cameras, and videophone cameras; and cameras incorporated in, or externally attached to, personal computers, portable terminals (for example, compact and portable information device terminals such as mobile telephones and mobile computers), peripheral devices (such as scanners and printers) for those, other digital devices, and the like. As these examples suggest, not only can an imaging optical device be used to build a camera, an imaging optical device can be incorporated in various appliances to additionally equip them with camera capabilities. It is possible to build, for example, a digital appliance equipped with an image input capability, such as a camera-equipped mobile telephone.

Figure 13:
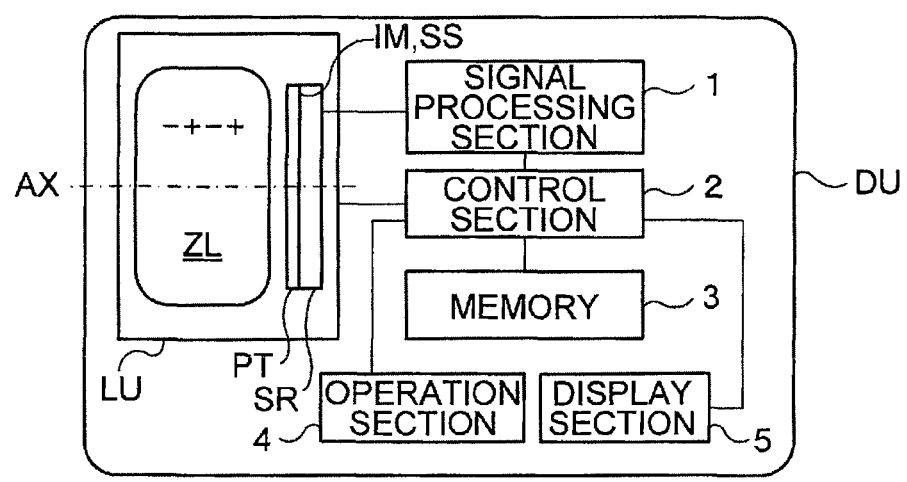
FIG. 13 is a schematic diagram showing an example of an outline of the configuration of a digital appliance incorporating an imaging optical device.

FIG. 13 shows, in a schematic sectional view, an example of the configuration of a digital appliance DU equipped with an image input capability. The digital appliance DU shown in FIG. 13 incorporates an imaging optical device LU, which is provided with, from the object side (that is, from the subject side), a zoom lens system ZL (with AX representing the optical axis) which forms an optical image (image plane) IM of an object in a zoomable fashion, a plane-parallel plate PT (corresponding to the cover glass of an image sensor SR, and to optical filters arranged as necessary, such as an optical low-pass filter and an infrared cut filter), and an image sensor SR which converts the optical image IM formed on a light-sensing surface SS by the zoom lens system ZL into an electrical signal. When this imaging optical device LU is incorporated in a digital appliance DU equipped with an image input capability, the former is typically arranged inside the body of the latter; when realizing camera capabilities, any manner of implementation can be adopted as necessary. For example, the imaging optical device LU built as a unit can be detachably or rotatably attached to the body of the digital appliance DU.

The zoom lens system ZL has a four-unit, namely negative-positive-negative-positive, zoom arrangement, achieves magnification variation (that is, zooming) by moving at least the first to third lens groups along the optical axis AX and thereby varying the distances between those lens groups, achieves focusing by moving the third lens group along the optical axis AX (achieving focusing on a short-distance object by moving the third lens group toward the image side), and forms the optical image IM on the light-sensing surface SS of the image sensor SR.

Used as the image sensor SR is a solid-state image sensor such as a CCD (charge-coupled device) image sensor or a CMOS (complementary metal-oxide semiconductor) image sensor. The zoom lens system ZL is so arranged as to form the optical image IM of the subject on the light-sensing surface SS, which is the photoelectric conversion portion of the image sensor SR; thus, the optical image IM formed by the zoom lens system ZL is converted into an electrical signal by the image sensor SR.

The digital appliance DU is provided with, in addition to the imaging optical device LU, a signal processing section 1, a control section 2, a memory 3, an operation section 4, a display section 5, etc. The signal generated by the image sensor SR is subjected to predetermined digital image processing, image compression, etc. as necessary in the signal processing section 1, and the resulting digital video signal is recorded to the memory 3 (such as a semiconductor memory or an optical disc) and, as the case may be, is transferred to an external device via a cable or in a form converted into an infrared signal or the like (for example, the communication capabilities of a mobile telephone). The control section 2 includes a microcomputer, and performs, in a concentrated fashion, control such as the control of functions such as image-shooting functions (such as still-image and moving image shooting functions) and image playback functions and the control of lens movement mechanisms for zooming, focusing, camera shake correction, etc. For example, the control section 2 controls the imaging optical device LU so as to shoot at least either a still or moving image of the subject. The display section 5 includes a display such as a liquid crystal monitor or the like, and displays images by using the image signal resulting from the conversion by the image sensor SR or by using image information recorded on the memory 3. The operation section 4 includes operated members such as operation buttons (for example, a shutter-release button) and operation dials (for example, a shooting mode dial), and conveys to the control section 2 the information that the operator enters through operation.

Now, by way of a first to a sixth embodiment of the present invention, specific optical arrangements of the zoom lens system ZL will be described in more detail. FIGS. 1 to 6 are optical arrangement diagrams of the zoom lens system ZL in the first to six embodiments respectively, showing, in an optical section, the lens arrangement, optical path, etc. as observed at each of the wide-angle end (W), the middle-focal-length position (M), and the telephoto end (T). In each optical arrangement diagram, arrows m1, m2, m3, and m4 indicate the movement of the first, second, third, and fourth lens groups Gr1, Gr2, Gr3, and Gr4, respectively, during zooming from the wide-angle end (W) to the telephoto end (T) (a broken line indicating a lens group that remains stationary during zooming).

In the first to sixth embodiments (FIGS. 1 to 6), the first to third lens groups Gr1 to Gr3 are movable groups, and the fourth lens group Gr4 is a stationary group. Thus, during zooming, the first to third lens groups Gr1 to Gr3 move; the fourth lens group Gr4 remains stationary during zooming. During zooming from the wide-angle end (W) to the telephoto end (T), the distance between the first and second lens groups Gr1 and Gr2 decreases, the distance between the second and third lens groups Gr2 and Gr3 varies, and the distance between the third and fourth groups Gr3 and Gr4 increases. In all the embodiments, the second and third lens groups Gr2 and Gr3 move monotonically toward the object side. In the first and fifth embodiments (FIGS. 1 and 5), the first lens group Gr1 moves in such a way as to make a small U turn near the telephoto end (T); in the second to fourth and sixth embodiments (FIGS. 2 to 4 and 6), the first lens group Gr1 moves monotonically toward the image side. In all the embodiments, the first lens group Gr1 is composed of three lens elements, namely a negative meniscus lens element having aspherical surfaces on both sides, a biconcave lens element, and a positive lens element, and the fourth lens group Gr4 is composed of one positive lens element.

The third lens group Gr3 is a focusing group; as indicated by arrow mF, during focusing on a short-distance object, it moves toward the image side. The third lens group Gr3 is composed of one negative meniscus lens element convex to the object side, and this lens element has spherical surfaces on both sides. Since the third lens group Gr3 is composed of one negative lens element and thus is lightweight, it is advantageous to focusing.

In the first to fourth and sixth embodiments (FIGS. 1 to 4 and 6), an aperture stop ST is located within the second lens group Gr2, and moves together with the second lens group Gr2 during zooming. In the fifth embodiment (FIG. 5), an aperture stop ST is located to the object side of the second lens group Gr2, and moves together with the second lens group Gr2 during zooming. In all the embodiments, the second lens group Gr2 has at least one air gap inside it. When the second lens group Gr2 is divided into two lens groups on opposite sides of the largest air gap within the second lens group Gr2, the object-side lens group is a 2a-th lens group Gr2a having a positive optical power, and the image-side lens group is a 2b-th lens group Gr2b having a positive optical power. The aperture stop ST is arranged to the object side of the 2b-th lens group Gr2b, and at the most object-side position in the 2b-th lens group Gr2b, a surface concave to the object side is arranged.

In the first to third embodiments (FIGS. 1 to 3), in the four-group, namely negative-positive-negative-positive, zoom arrangement, each group is composed as follows. The first lens group Gr1 is composed of, from the object side, a negative meniscus lens element concave to the image side (having aspherical surfaces on both sides), a biconcave negative lens element, and a positive meniscus lens element convex to the object side. The second lens group Gr2 is composed of, from the object side, a 2a-th lens group Gr2a and a 2b-th lens group Gr2b, and between the 2a-th and 2b-th lens groups Gr2a and Gr2b, an aperture stop ST is arranged. The 2a-th lens group Gr2a is composed of one biconvex positive lens element. The 2b-th lens group Gr2b is composed of, from the object side, a negative meniscus lens element concave to the object side, a cemented lens element composed of a negative meniscus lens element concave to the image side and a biconvex positive lens element, and a biconvex positive lens element (having an aspherical surface on the image side). The third lens group Gr3 is composed of one negative meniscus lens element concave to the image side. The fourth lens group Gr4 is composed of one biconvex positive lens element.

In the fourth embodiment (FIG. 4), in the four-group, namely negative-positive-negative-positive, zoom arrangement, each group is composed as follows. The first lens group Gr1 is composed of, from the object side, a negative meniscus lens element concave to the image side (having aspherical surfaces on both sides), a biconcave negative lens element, and a biconvex positive lens element. The second lens group Gr2 is composed of, from the object side, a 2a-th lens group Gr2a and a 2b-th lens group Gr2b, and between the 2a-th and 2b-th lens groups Gr2a and Gr2b, an aperture stop ST is arranged. The 2a-th lens group Gr2a is composed of one cemented lens element composed of a negative meniscus lens element concave to the image side and a biconvex positive lens element. The 2b-th lens group Gr2b is composed of, from the object side, a cemented lens element composed of a biconcave negative lens element and a biconvex positive lens element, a cemented lens element composed of a biconvex positive lens element and a negative meniscus lens element concave to the object side, and a cemented lens element composed of a negative meniscus lens element concave to the image side and a biconvex positive lens element. The third lens group Gr3 is composed of one negative meniscus lens element concave to the image side. The fourth lens group Gr4 is composed of one biconvex positive lens element (having an aspherical surface on the object side).

In the fifth embodiment (FIG. 5), in the four-group, namely negative-positive-negative-positive, zoom arrangement, each group is composed as follows. The first lens group Gr1 is composed of, from the object side, a negative meniscus lens element concave to the image side (having aspherical surfaces on both sides), a biconcave negative lens element, and a positive meniscus lens element convex to the object side. The second lens group Gr2 is composed of from the object side, a 2a-th lens group Gr2a and a 2b-th lens group Gr2b, and to the object side of the 2a-th lens group Gr2a, an aperture stop ST is arranged. The 2a-th lens group Gr2a is composed of one biconvex positive lens element. The 2b-th lens group Gr2b is composed of, from the object side, a negative meniscus lens element concave to the object side, a cemented lens element composed of a negative meniscus lens element concave to the image side and a biconvex positive lens element, and a plano-convex lens element convex to the object side (having an aspherical surface on the object side). The third lens group Gr3 is composed of one negative meniscus lens element concave to the image side. The fourth lens group Gr4 is composed of one biconvex positive lens element.

In the sixth embodiment (FIG. 6), in the four-group, namely negative-positive-negative-positive, zoom arrangement, each group is composed as follows. The first lens group Gr1 is composed of, from the object side, a negative meniscus lens element concave to the image side (having aspherical surfaces on both sides), a biconcave negative lens element, and a positive meniscus lens element convex to the object side. The second lens group Gr2 is composed of, from the object side, a 2a-th lens group Gr2a and a 2b-th lens group Gr2b, and between the 2a-th and 2b-th lens groups Gr2a and Gr2b, an aperture stop ST is arranged. The 2a-th lens group Gr2a is composed of one cemented lens element composed of a negative meniscus lens element concave to the image side and a biconvex positive lens element. The 2b-th lens group Gr2b is composed of, from the object side, a negative meniscus lens element concave to the object side, a cemented lens element composed of a negative meniscus lens element concave to the image side and a biconvex positive lens element, and a biconvex positive lens element (having an aspherical surface on the image side). The third lens group Gr3 is composed of one negative meniscus lens element concave to the image side. The fourth lens group Gr4 is composed of one biconvex positive lens element.

EXAMPLES

Hereinafter, the construction and other features of zoom lens systems according to the present invention will be described more specifically with reference to the construction data etc. of practical examples. Examples 1 to 6 (EX1 to EX6) presented below are numerical examples corresponding to the first to sixth embodiments described previously, and the optical arrangement diagrams (FIGS. 1 to 6) showing the first to sixth embodiments also show the lens arrangements of the corresponding ones of Examples 1 to 6.

In the construction data of each practical example, given as surface data are, from the leftmost column rightward, surface number, radius of curvature r (mm), axial surface-to-surface distance d (mm), refractive index nd for the d-line, Abbe number vd for the d-line, and anomalous dispersion ΔPgF. A surface number marked with an asterisk ("*") indicates an aspherical surface, whose surface shape is defined by formula (AS) below based on a local rectangular coordinate system (x, y, z) with its origin at the vertex of the surface. Given as aspherical surface data are aspherical surface coefficients etc. In the aspherical surface data of each example, any term that is not expressly indicated has a coefficient of 0, and throughout the data, "E-n" stands for "×10$^{-n}$."

$$z=(c\cdot h^2)/(1+\sqrt{1-(1+K)\cdot c^2 \cdot h^2})+\Sigma(Aj\cdot h^j) \quad \text{AS}$$

where h represents the height in the direction perpendicular to the z axis (the optical axis AX) ($h^2=x^2+y^2$);

z represents the amount of sag in the optical axis AX direction at the height h (with reference to the vertex);

c represents the curvature at the vertex (the reciprocal of the radius of curvature r);

K represents the conic constant; and

Aj represents the aspherical surface coefficient of order j.

Given as miscellaneous data are zoom ratio (magnification variation ratio); and, for each of different focal length states W, M, and T, focal length (f, mm) of the entire system, f-number (FNO), half-angle of view (ω, °), image height (Y', mm), lens total length (TL, mm), back focal length (BF, mm), and variable axial surface-to-surface distances di (i representing the surface number, mm). Given as zooming lens group data are focal lengths (f1, f2, f3, f4; mm) of individual lens groups. It should be noted that, here, BF is the distance from the image-side surface of the cover glass (corresponding to the plane-parallel plate PT) to the image plane, and the lens total length is the distance from the foremost lens surface to the image plane. Table 1 lists the values of the parameters used in the conditional formulae in each practical example, and Table 2 lists the values corresponding to the conditional formulae in each practical example.

FIGS. 7A-7I to 12A-12I are aberration diagrams (longitudinal aberration diagrams in the state focused on infinity) corresponding to Examples 1 to 6 (EX1 to EX6) respectively, showing different aberrations (from left rightward, spherical aberration and sine condition, astigmatism, and distortion) at the wide-angle end (W), the middle position (M), and the telephoto end (T). In FIGS. 7A-7I to 12A-12I, FNO represents the f-number, and Y' (mm) represents the maximum image height (corresponding to the distance from the optical axis AX) on the light-sensing surface SS of the image sensor SR. In spherical aberration diagrams, the solid line d, the dash-and-dot line g, and the dash-dot-dot line c indicate the spherical aberration (mm) for the d-, g-, and c-line respectively, and the broken line SC indicates the deviation (mm) from the sine condition. In astigmatism diagrams, the broken line DM and the solid line DS represent the meridional and sagittal image surfaces respectively, indicating the astigmatism (mm) for the d-line. In distortion diagrams, the' solid line indicates the distortion (%) for the d-line.

Example 1

Unit: mm

Surface Data

| Surface Number | r | d | nd | vd | ΔPgF |
|---|---|---|---|---|---|
| 1* | 202.418 | 2.600 | 1.80860 | 40.41 | −0.0070 |
| 2* | 17.361 | 7.023 | | | |
| 3 | −49.667 | 1.200 | 1.69680 | 55.48 | −0.0059 |
| 4 | 15.160 | 4.932 | | | |
| 5 | 29.015 | 2.785 | 1.90366 | 31.31 | 0.0028 |
| 6 | 4533.499 | d6 | | | |
| 7 | 14.420 | 1.988 | 1.51742 | 52.16 | 0.0045 |
| 8 | −140.565 | 1.500 | | | |
| 9 (Aperture Stop) | ∞ | 7.229 | | | |
| 10 | −13.148 | 1.400 | 1.90366 | 31.31 | 0.0028 |
| 11 | −44.448 | 0.300 | | | |
| 12 | 12.256 | 0.700 | 1.83481 | 42.72 | −0.0062 |
| 13 | 8.499 | 4.638 | 1.49700 | 81.61 | 0.0375 |
| 14 | −18.648 | 0.300 | | | |
| 15 | 39.681 | 2.000 | 1.58313 | 59.38 | −0.0031 |
| 16* | −753.937 | d16 | | | |
| 17 | 38.598 | 0.800 | 1.80610 | 40.73 | −0.0078 |
| 18 | 17.875 | d18 | | | |
| 19 | 44.781 | 2.526 | 1.48749 | 70.45 | 0.0092 |
| 20 | −147.013 | 11.000 | | | |
| 21 | ∞ | 3.000 | 1.51680 | 64.20 | 0.0016 |
| 22 | ∞ | BF | | | |

Aspherical Surface Data

| | K | A4 | A6 | A8 |
|---|---|---|---|---|
| Surface 1 | 0.00000 | 1.07354E−04 | −7.59821E−07 | 3.63835E−09 |
| Surface 2 | 0.00000 | 9.53625E−05 | −3.07547E−07 | −6.67777E−09 |
| Surface 16 | 0.00000 | 1.68643E−04 | −4.76506E−07 | 3.84846E−08 |

| | A10 | A12 | A14 |
|---|---|---|---|
| Surface 1 | −1.14626E−11 | 2.14451E−14 | −1.82714E−17 |
| Surface 2 | 7.05142E−11 | −3.40278E−13 | 5.63241E−16 |
| Surface 16 | −9.55851E−10 | 7.45116E−12 | |

Miscellaneous Data
Zoom Ratio 1.90244

| | Wide-Angle (W) | Middle (M) | Telephoto (T) |
|---|---|---|---|
| Focal Length | 9.225 | 12.728 | 17.550 |
| F-number | 3.600 | 4.011 | 4.627 |
| Half-Angle of View | 49.536 | 40.355 | 31.643 |
| Image Height | 9.634 | 10.329 | 10.677 |
| Lens Total Length | 84.500 | 77.865 | 76.573 |
| BF | 2.000 | 2.000 | 2.000 |
| d6 | 21.026 | 9.903 | 2.214 |
| d16 | 1.816 | 4.270 | 6.827 |
| d18 | 3.738 | 5.772 | 9.612 |

Zooming Lens Group Data

| Group | Starting Surface | Focal Length |
|---|---|---|
| 1 | 1 | −16.154 |
| 2 | 7 | 20.464 |
| 3 | 17 | −42.025 |
| 4 | 19 | 70.717 |

Example 2

Unit: mm

Surface Data

| Surface Number | r | d | nd | vd | ΔPgF |
|---|---|---|---|---|---|
| 1* | 168.554 | 2.600 | 1.80860 | 40.41 | −0.0070 |
| 2* | 22.517 | 6.957 | | | |
| 3 | −60.873 | 1.200 | 1.69680 | 55.48 | −0.0059 |
| 4 | 15.232 | 8.232 | | | |
| 5 | 35.536 | 2.139 | 1.90366 | 31.31 | 0.0028 |
| 6 | 141.629 | d6 | | | |
| 7 | 13.966 | 2.224 | 1.51823 | 58.96 | 0.0020 |
| 8 | −128.310 | 1.500 | | | |
| 9 (Aperture Stop) | ∞ | 7.567 | | | |
| 10 | −11.663 | 1.887 | 1.83400 | 37.35 | −0.0021 |
| 11 | −32.179 | 0.300 | | | |
| 12 | 12.092 | 0.700 | 1.77250 | 49.65 | −0.0086 |
| 13 | 7.757 | 4.518 | 1.49700 | 81.61 | 0.0375 |
| 14 | −17.599 | 0.300 | | | |
| 15 | 28.878 | 1.500 | 1.58313 | 59.38 | −0.0031 |
| 16* | −456.367 | d16 | | | |
| 17 | 328.981 | 0.800 | 1.91082 | 35.25 | −0.0026 |
| 18 | 16.445 | d18 | | | |
| 19 | 32.730 | 3.427 | 1.48749 | 70.45 | 0.0092 |
| 20 | −60.808 | 11.000 | | | |
| 21 | ∞ | 3.000 | 1.51680 | 64.20 | 0.0016 |
| 22 | ∞ | BF | | | |

Aspherical Surface Data

| | K | A4 | A6 | A8 |
|---|---|---|---|---|
| Surface 1 | 0.00000 | 1.02140E−04 | −6.00174E−07 | 2.24420E−09 |
| Surface 2 | 0.00000 | 9.78982E−05 | −2.21671E−07 | −5.66777E−09 |
| Surface 16 | 0.00000 | 1.61619E−04 | −1.25844E−06 | 6.42395E−08 |

| | A10 | A12 | A14 |
|---|---|---|---|
| Surface 1 | −4.80900E−12 | 5.20313E−15 | −1.79087E−18 |
| Surface 2 | 5.44982E−11 | −2.12181E−13 | 2.91501E−16 |
| Surface 16 | −2.13844E−09 | 1.94869E−11 | |

Miscellaneous Data
Zoom Ratio 1.90244

| | Wide-Angle (W) | Middle (M) | Telephoto (T) |
|---|---|---|---|
| Focal Length | 9.225 | 12.728 | 17.550 |
| F-number | 3.600 | 3.966 | 4.627 |
| Half-Angle of View | 49.536 | 40.355 | 31.643 |
| Image Height | 9.624 | 10.328 | 10.659 |
| Lens Total Length | 90.000 | 81.856 | 79.364 |
| BF | 2.000 | 2.000 | 2.000 |
| d6 | 23.261 | 10.827 | 2.214 |
| d16 | 1.672 | 3.333 | 5.147 |
| d18 | 3.216 | 5.845 | 10.151 |

Zooming Lens Group Data

| Group | Starting Surface | Focal Length |
|---|---|---|
| 1 | 1 | −16.070 |
| 2 | 7 | 18.560 |
| 3 | 17 | −19.029 |
| 4 | 19 | 44.177 |

Example 3

Unit: mm

Surface Data

| Surface Number | r | d | nd | vd | ΔPgF |
|---|---|---|---|---|---|
| 1* | 180.801 | 2.600 | 1.80860 | 40.41 | −0.0070 |
| 2* | 20.039 | 7.209 | | | |
| 3 | −47.678 | 1.200 | 1.69680 | 55.48 | −0.0059 |
| 4 | 14.607 | 5.558 | | | |
| 5 | 29.599 | 3.665 | 1.90366 | 31.31 | 0.0028 |
| 6 | 414.421 | d6 | | | |
| 7 | 16.071 | 2.282 | 1.51823 | 58.96 | 0.0020 |
| 8 | −45.013 | 1.500 | | | |
| 9 (Aperture Stop) | ∞ | 6.234 | | | |
| 10 | −12.029 | 1.400 | 1.83400 | 37.35 | −0.0021 |
| 11 | −127.549 | 0.300 | | | |
| 12 | 11.631 | 0.700 | 1.77250 | 49.65 | −0.0086 |
| 13 | 7.832 | 5.127 | 1.49700 | 81.61 | 0.0375 |
| 14 | −13.830 | 0.300 | | | |
| 15 | 78.034 | 1.500 | 1.58313 | 59.38 | −0.0031 |
| 16* | −892.044 | d16 | | | |
| 17 | 36.655 | 0.800 | 1.91082 | 35.25 | −0.0026 |
| 18 | 19.197 | d18 | | | |
| 19 | 33.893 | 2.448 | 1.48749 | 70.45 | 0.0092 |
| 20 | −3128.736 | 11.000 | | | |
| 21 | ∞ | 3.000 | 1.51680 | 64.20 | 0.0016 |
| 22 | ∞ | BF | | | |

Aspherical Surface Data

| | K | A4 | A6 | A8 |
|---|---|---|---|---|
| Surface 1 | 0.00000 | 1.21740E−04 | −9.26923E−07 | 4.58580E−09 |
| Surface 2 | 0.00000 | 1.16298E−04 | −4.63113E−07 | −8.54057E−09 |
| Surface 16 | 0.00000 | 1.81656E−04 | −3.48179E−07 | 6.53116E−08 |

| | A10 | A12 | A14 |
|---|---|---|---|
| Surface 1 | −1.36607E−11 | 2.20118E−14 | −1.45367E−17 |
| Surface 2 | 1.15696E−10 | −6.03818E−13 | 1.11559E−15 |
| Surface 16 | −1.73296E−09 | 1.46747E−11 | |

Miscellaneous Data
Zoom Ratio 1.90244

| | Wide-Angle (W) | Middle (M) | Telephoto (T) |
|---|---|---|---|
| Focal Length | 9.225 | 12.728 | 17.550 |
| F-number | 3.600 | 3.973 | 4.506 |
| Half-Angle of View | 49.536 | 40.355 | 31.643 |
| Image Height | 9.636 | 10.451 | 10.855 |
| Lens Total Length | 88.669 | 80.471 | 77.270 |
| BF | 2.000 | 2.000 | 2.000 |
| d6 | 23.155 | 10.953 | 2.214 |
| d16 | 2.732 | 6.332 | 11.042 |
| d18 | 3.958 | 4.363 | 5.191 |

Zooming Lens Group Data

| Group | Starting Surface | Focal Length |
|---|---|---|
| 1 | 1 | −16.423 |
| 2 | 7 | 21.349 |
| 3 | 17 | −45.242 |
| 4 | 19 | 68.797 |

Example 4

Unit: mm

Surface Data

| Surface Number | r | d | nd | vd | ΔPgF |
|---|---|---|---|---|---|
| 1* | 90.866 | 2.600 | 1.80860 | 40.41 | −0.0070 |
| 2* | 17.250 | 7.148 | | | |
| 3 | −48.312 | 1.200 | 1.61800 | 63.38 | 0.0060 |
| 4 | 16.295 | 3.620 | | | |
| 5 | 27.915 | 3.486 | 1.72825 | 28.31 | 0.0085 |
| 6 | −167.542 | d6 | | | |

-continued

Unit: mm

| | | | | | |
|---|---|---|---|---|---|
| 7 | 19.775 | 0.900 | 1.84666 | 23.78 | 0.0137 |
| 8 | 10.918 | 2.285 | 1.59551 | 39.23 | 0.0027 |
| 9 | −36.732 | 2.867 | | | |
| 10 (Aperture Stop) | ∞ | 3.121 | | | |
| 11 | −11.617 | 2.368 | 1.75211 | 25.05 | 0.0159 |
| 12 | 15.922 | 3.523 | 1.92286 | 20.88 | 0.0282 |
| 13 | −16.944 | 0.200 | | | |
| 14 | 377.249 | 3.485 | 1.49699 | 81.47 | 0.0375 |
| 15 | −10.770 | 0.800 | 1.84666 | 23.78 | 0.0137 |
| 16 | −21.579 | 0.200 | | | |
| 17 | 43.274 | 0.800 | 1.90366 | 31.31 | 0.0028 |
| 18 | 12.509 | 4.209 | 1.49699 | 81.47 | 0.0375 |
| 19 | −33.711 | d19 | | | |
| 20 | 102.175 | 0.800 | 1.48749 | 70.45 | 0.0092 |
| 21 | 33.685 | d21 | | | |
| 22* | 44.306 | 2.223 | 1.58313 | 59.38 | −0.0031 |
| 23 | −512.317 | 11.000 | | | |
| 24 | ∞ | 3.000 | 1.51680 | 64.20 | 0.0016 |
| 25 | ∞ | BF | | | |

Aspherical Surface Data

| | K | A4 | A6 | A8 |
|---|---|---|---|---|
| Surface 1 | 0.00000 | 3.80764E−05 | −2.19432E−07 | 7.51580E−10 |
| Surface 2 | 0.00000 | 1.25436E−05 | −1.53983E−07 | −1.32273E−09 |
| Surface 22 | 0.00000 | −3.50645E−05 | 3.97870E−07 | −7.36462E−09 |

| | A10 | A12 | A14 |
|---|---|---|---|
| Surface 1 | −1.96686E−12 | 3.95921E−15 | −4.30564E−18 |
| Surface 2 | 1.74663E−12 | 2.24454E−14 | −9.49444E−17 |
| Surface 22 | 6.81525E−11 | −2.44075E−13 | |

Miscellaneous Data
Zoom Ratio 1.90244

| | Wide-Angle (W) | Middle (M) | Telephoto (T) |
|---|---|---|---|
| Focal Length | 9.225 | 12.728 | 17.550 |
| F-number | 3.600 | 4.031 | 4.600 |
| Half-Angle of View | 49.536 | 40.355 | 31.643 |
| Image Height | 9.634 | 10.404 | 10.856 |
| Lens Total Length | 91.846 | 84.726 | 82.123 |
| BF | 2.000 | 2.000 | 2.000 |
| d6 | 23.324 | 11.212 | 2.214 |
| d19 | 1.600 | 3.861 | 7.736 |
| d21 | 5.088 | 7.819 | 10.338 |

Zooming Lens Group Data

| Group | Starting Surface | Focal Length |
|---|---|---|
| 1 | 1 | −19.491 |
| 2 | 7 | 22.936 |
| 3 | 20 | −103.480 |
| 4 | 22 | 70.035 |

Example 5

Unit: mm

Surface Data

| Surface Number | r | d | nd | vd | ΔPgF |
|---|---|---|---|---|---|
| 1* | 216.715 | 2.600 | 1.80860 | 40.41 | −0.0070 |
| 2* | 20.136 | 7.623 | | | |
| 3 | −37.237 | 1.447 | 1.69680 | 55.48 | −0.0059 |
| 4 | 13.120 | 3.785 | | | |
| 5 | 23.177 | 5.990 | 1.90366 | 31.31 | 0.0028 |
| 6 | 270.876 | d6 | | | |
| 7 (Aperture Stop) | ∞ | 4.043 | | | |

-continued

Unit: mm

| | | | | | |
|---|---|---|---|---|---|
| 8 | 13.034 | 3.998 | 1.51823 | 58.96 | 0.0020 |
| 9 | −51.553 | 4.691 | | | |
| 10 | −15.489 | 1.400 | 1.91082 | 35.25 | −0.0026 |
| 11 | −103.074 | 0.300 | | | |
| 12 | 12.464 | 0.700 | 1.83481 | 42.72 | −0.0062 |
| 13 | 8.887 | 4.768 | 1.49700 | 81.61 | 0.0375 |
| 14 | −18.089 | 0.300 | | | |
| 15* | 112.624 | 1.500 | 1.58313 | 59.38 | −0.0031 |
| 16 | ∞ | d16 | | | |
| 17 | 108.106 | 0.800 | 1.83481 | 42.72 | −0.0062 |
| 18 | 20.891 | d18 | | | |
| 19 | 40.627 | 3.541 | 1.49700 | 81.61 | 0.0375 |
| 20 | −53.205 | 12.000 | | | |
| 21 | ∞ | 3.000 | 1.51680 | 64.20 | 0.0016 |
| 22 | ∞ | BF | | | |

Aspherical Surface Data

| | K | A4 | A6 | A8 |
|---|---|---|---|---|
| Surface 1 | 0.00000 | 9.78270E−05 | −3.96739E−07 | 1.04010E−09 |
| Surface 2 | 0.00000 | 8.00729E−05 | 7.40588E−08 | −2.99427E−09 |
| Surface 15 | 0.00000 | −1.94917E−04 | −5.69038E−07 | 4.41353E−09 |

| | A10 | A12 | A14 |
|---|---|---|---|
| Surface 1 | −2.44027E−12 | 4.51134E−15 | −4.80714E−18 |
| Surface 2 | −6.22485E−12 | 1.34619E−14 | 1.07821E−16 |
| Surface 15 | −5.11978E−10 | 9.10268E−12 | |

Miscellaneous Data
Zoom Ratio 1.90244

| | Wide-Angle (W) | Middle (M) | Telephoto (T) |
|---|---|---|---|
| Focal Length | 9.225 | 12.728 | 17.550 |
| F-number | 3.600 | 3.991 | 4.586 |
| Half-Angle of View | 49.536 | 40.355 | 31.643 |
| Image Height | 9.634 | 10.340 | 10.641 |
| Lens Total Length | 88.484 | 83.676 | 84.094 |
| BF | 2.000 | 2.000 | 2.000 |
| d6 | 18.899 | 9.079 | 2.310 |
| d16 | 1.600 | 3.940 | 6.440 |
| d18 | 3.500 | 6.172 | 10.858 |

Zooming Lens Group Data

| Group | Starting Surface | Focal Length |
|---|---|---|
| 1 | 1 | −15.125 |
| 2 | 7 | 19.183 |
| 3 | 17 | −31.149 |
| 4 | 19 | 46.939 |

Example 6

Unit: mm

Surface Data

| Surface Number | r | d | nd | vd | ΔPgF |
|---|---|---|---|---|---|
| 1* | 146.280 | 2.600 | 1.80860 | 40.41 | −0.0070 |
| 2* | 20.155 | 7.517 | | | |
| 3 | −43.716 | 1.465 | 1.71300 | 53.93 | −0.0070 |
| 4 | 16.180 | 6.136 | | | |
| 5 | 34.034 | 3.369 | 1.90366 | 31.31 | 0.0028 |
| 6 | 1351.019 | d6 | | | |
| 7 | 14.251 | 1.604 | 1.84666 | 23.78 | 0.0137 |
| 8 | 10.891 | 2.514 | 1.56732 | 42.85 | 0.0031 |
| 9 | −61.652 | 4.610 | | | |
| 10 (Aperture Stop) | ∞ | 2.927 | | | |
| 11 | −11.716 | 1.401 | 1.80610 | 33.27 | 0.0000 |

-continued

Unit: mm

| | | | | | |
|---|---|---|---|---|---|
| 12 | −56.007 | 0.300 | | | |
| 13 | 15.119 | 0.700 | 1.80420 | 46.49 | −0.0066 |
| 14 | 9.318 | 5.696 | 1.49700 | 81.61 | 0.0375 |
| 15 | −14.974 | 0.300 | | | |
| 16 | 40.825 | 2.398 | 1.58913 | 61.24 | −0.0007 |
| 17* | −6110.533 | d17 | | | |
| 18 | 62.421 | 0.800 | 1.83481 | 42.72 | −0.0062 |
| 19 | 18.031 | d19 | | | |
| 20 | 28.631 | 3.292 | 1.51680 | 64.20 | 0.0016 |
| 21 | −108.150 | 11.500 | | | |
| 22 | ∞ | 3.000 | 1.51680 | 64.20 | 0.0016 |
| 23 | ∞ | BF | | | |

Aspherical Surface Data

| | K | A4 | A6 | A8 |
|---|---|---|---|---|
| Surface 1 | 0.00000 | 6.37135E−05 | −2.41600E−07 | 7.43044E−10 |
| Surface 2 | 0.00000 | 4.57346E−05 | −8.96849E−09 | −1.02295E−09 |
| Surface 17 | 0.00000 | 1.04588E−04 | −1.28452E−07 | 1.23395E−09 |

| | A10 | A12 | A14 |
|---|---|---|---|
| Surface 1 | −2.03920E−12 | 3.77698E−15 | −2.28613E−18 |
| Surface 2 | −2.21792E−12 | 5.78397E−15 | 2.45468E−17 |
| Surface 17 | 2.93656E−11 | −2.11194E−12 | |

Miscellaneous Data
Zoom Ratio 1.902

| | Wide-Angle (W) | Middle (M) | Telephoto (T) |
|---|---|---|---|
| Focal Length | 9.225 | 12.728 | 17.550 |
| F-number | 3.683 | 4.032 | 4.627 |
| Half-Angle of View | 49.536 | 40.355 | 31.643 |
| Image Height | 9.633 | 10.383 | 10.765 |
| Lens Total Length | 94.574 | 85.218 | 80.873 |
| BF | 2.000 | 2.000 | 2.000 |
| d6 | 25.187 | 11.893 | 2.238 |
| d17 | 1.600 | 5.140 | 9.983 |
| d19 | 3.659 | 4.058 | 4.523 |

Zooming Lens Group Data

| Group | Starting Surface | Focal Length |
|---|---|---|
| 1 | 1 | −16.517 |
| 2 | 7 | 21.936 |
| 3 | 18 | −30.623 |
| 4 | 20 | 44.167 |

TABLE 1

| | Example 1 | Example 2 | Example 3 | Example 4 | Example 5 | Example 6 |
|---|---|---|---|---|---|---|
| f1 | −16.154 | −16.070 | −16.423 | −19.491 | −15.125 | −16.517 |
| f2 | 20.464 | 18.560 | 21.349 | 22.936 | 19.183 | 21.936 |
| f4 | 70.717 | 44.177 | 68.797 | 70.035 | 46.939 | 44.167 |
| ΔPgF | 0.0375 | 0.0375 | 0.0375 | 0.0375 | 0.038 | 0.038 |
| nn | 1.835 | 1.773 | 1.773 | 1.904 | 1.835 | 1.804 |
| np | 1.497 | 1.497 | 1.497 | 1.497 | 1.497 | 1.497 |
| R1 | 38.598 | 328.981 | 36.655 | 102.175 | 108.106 | 62.421 |
| R2 | 17.875 | 16.445 | 19.197 | 33.685 | 20.891 | 18.031 |
| β3t | 1.732 | 2.958 | 1.589 | 1.303 | 2.261 | 2.077 |
| R2b | −13.148 | −11.663 | −12.029 | −11.617 | −15.489 | −11.716 |
| Ds | 7.229 | 7.567 | 6.234 | 3.121 | 12.732 | 2.927 |
| f2a | 25.387 | 24.434 | 23.147 | 28.015 | 20.509 | 23.097 |

TABLE 2

| Conditional Formula | Example 1 | Example 2 | Example 3 | Example 4 | Example 5 | Example 6 |
|---|---|---|---|---|---|---|
| (1) \|f2/f1\| | 1.267 | 1.155 | 1.300 | 1.177 | 1.268 | 1.328 |
| (2) \|f4/f1\| | 4.378 | 2.749 | 4.189 | 3.593 | 3.103 | 2.674 |
| (3) ΔPgF | 0.0375 | 0.0375 | 0.0375 | 0.0375 | 0.0375 | 0.0375 |
| (4) nn − np | 0.338 | 0.276 | 0.276 | 0.407 | 0.338 | 0.307 |
| (5) (R1 + R2)/(R1 − R2) | 2.725 | 1.105 | 3.199 | 1.984 | 1.479 | 1.812 |
| (6) β3t | 1.732 | 2.958 | 1.589 | 1.303 | 2.261 | 2.077 |
| (7) R2b/Ds | −1.819 | −1.541 | −1.930 | −3.722 | −1.217 | −4.003 |
| (8) f2a/f2 | 1.241 | 1.316 | 1.084 | 1.221 | 1.069 | 1.053 |

What is claimed is:

1. A zoom lens system comprising, from an object side, a first lens group having a negative optical power, a second lens group having a positive optical power, a third lens group having a negative optical power, and a fourth lens group having a positive optical power, the zoom lens system achieving zooming by varying distances between the lens groups, wherein during zooming, at least the first to third lens groups move individually, during zooming from a wide-angle end to a telephoto end, the distance between the first and second lens groups decreases, the distance between the second and third lens groups varies, and the distance between the third and fourth lens groups increases, and Conditional Formulae (1) and (2) below are fulfilled:

$$1.0 \leq |f2/f1| \leq 1.5 \tag{1}$$

$$2.0 \leq |f4/f1| \leq 5.0 \tag{2}$$

where f1 represents a focal length of the first lens group;
f2 represents a focal length of the second lens group; and
f4 represents a focal length of the fourth lens group.

2. The zoom lens system according to claim 1, wherein an aperture stop that moves together with the second lens group during zooming is provided to an object side of or within the second lens group, a cemented lens element formed by cementing together a negative lens element having a strong concave surface on an image side and a biconvex lens element is arranged within the second lens group, to an image side of the aperture stop, and a material of the biconvex lens element fulfills Conditional Formula (3) below:

$$\Delta PgF \geq 0.015 \tag{3}$$

where $\Delta PgF = PgF - \alpha gF - \beta gF \times vd$;
$PgF = (ng - nF)/(nF - nC)$;
ng represents a refractive index for a g-line;
nF represents a refractive index for an F-line;
nC represents a refractive index for a C-line;
$\alpha gF = 0.6483$;
$\beta gF = -0.0018$; and
vd represents an Abbe number of the lens material.

3. The zoom lens system according to claim 2, wherein materials of the lens elements composing the cemented lens element fulfill Conditional Formula (4) below $$nn - np \geq 0.25 \tag{4}$$

where nn represents a refractive index of the negative lens element for the d-line; and np represents a refractive index of the biconvex lens element for the d-line.

4. The zoom lens system according to claim 1, wherein a negative meniscus lens element that fulfills Conditional Formula (5) below is arranged in the third lens group:

$$1.0 \le (R1+R2)/(R1-R2) \le 3.5 \quad (5)$$

where
R1 represents a radius of curvature of an object-side surface of the negative meniscus lens element; and;
R2 represents a radius of curvature of an image-side surface of the negative meniscus lens element.

5. The zoom lens system according to claim 1, wherein focusing is achieved by moving the third lens group, and Conditional Formula (6) below is fulfilled:

$$1.2 \le \beta 3t \le 4.0 \quad (6)$$

where
$\beta 3t$ represents a paraxial lateral magnification at the telephoto end.

6. The zoom lens system according to claim 1, wherein
an aperture stop that moves together with the second lens group during zooming is provided to an object side of or within the second lens group,
the second lens group has at least one air gap inside,
when the second lens group is divided into two lens groups located to opposite sides of a largest air gap within the second lens group, with the object-side lens group referred to as a 2a-th lens group and the image-side lens group referred to as a 2b-th lens group,
the 2a-th lens group has a positive optical power,
the aperture stop is arranged to an object side of the 2b-th lens group,
a surface concave to the object side is arranged at a most object-side position in the 2b-th lens group, and
Conditional Formula (7) below is fulfilled:

$$-5.0 \le R2b/Ds \le -1.0 \quad (7)$$

where
R2b represents a radius of curvature of the concave surface; and
Ds represents a distance from the aperture stop to a vertex of the concave surface along the optical axis.

7. The zoom lens system according to claim 6, wherein Conditional Formula (8) is fulfilled:

$$0.9 \le f2a/f2 \le 1.4 \quad (8)$$

where
f2a represents a focal length of the 2a-th lens group; and
f2 represents a focal length of the second lens group.

8. The zoom lens system according to claim 1, wherein the zoom lens system is an interchangeable lens for a mirrorless camera.

9. The zoom lens system according to claim 2, wherein a negative meniscus lens element that fulfills Conditional Formula (5) below is arranged in the third lens group:

$$1.0 \le (R1+R2)/(R1-R2) \le 3.5 \quad (5)$$

where
R1 represents a radius of curvature of an object-side surface of the negative meniscus lens element; and;
R2 represents a radius of curvature of an image-side surface of the negative meniscus lens element.

10. The zoom lens system according to claim 2, wherein focusing is achieved by moving the third lens group, and Conditional Formula (6) below is fulfilled:

$$1.2 \le \beta 3t \le 4.0 \quad (6)$$

where
$\beta 3t$ represents a paraxial lateral magnification at the telephoto end.

11. The zoom lens system according to claim 2, wherein
an aperture stop that moves together with the second lens group during zooming is provided to an object side of or within the second lens group,
the second lens group has at least one air gap inside,
when the second lens group is divided into two lens groups located to opposite sides of a largest air gap within the second lens group, with the object-side lens group referred to as a 2a-th lens group and the image-side lens group referred to as a 2b-th lens group,
the 2a-th lens group has a positive optical power,
the aperture stop is arranged to an object side of the 2b-th lens group,
a surface concave to the object side is arranged at a most object-side position in the 2b-th lens group, and
Conditional Formula (7) below is fulfilled:

$$-5.0 \le R2b/Ds \le -1.0 \quad (7)$$

where
R2b represents a radius of curvature of the concave surface; and
Ds represents a distance from the aperture stop to a vertex of the concave surface along the optical axis.

12. The zoom lens system according to claim 11, wherein Conditional Formula (8) is fulfilled:

$$0.9 \le f2a/f2 \le 1.4 \quad (8)$$

where
f2a represents a focal length of the 2a-th lens group; and
f2 represents a focal length of the second lens group.

13. The zoom lens system according to claim 3, wherein a negative meniscus lens element that fulfills Conditional Formula (5) below is arranged in the third lens group:

$$1.0 \le (R1+R2)/(R1-R2) \le 3.5 \quad (5)$$

where
R1 represents a radius of curvature of an object-side surface of the negative meniscus lens element; and;
R2 represents a radius of curvature of an image-side surface of the negative meniscus lens element.

14. The zoom lens system according to claim 3, wherein focusing is achieved by moving the third lens group, and Conditional Formula (6) below is fulfilled:

$$1.2 \le \beta 3t \le 4.0 \quad (6)$$

where
$\beta 3t$ represents a paraxial lateral magnification at the telephoto end.

15. The zoom lens system according to claim 3, wherein
an aperture stop that moves together with the second lens group during zooming is provided to an object side of or within the second lens group,
the second lens group has at least one air gap inside,
when the second lens group is divided into two lens groups located to opposite sides of a largest air gap within the second lens group, with the object-side lens group referred to as a 2a-th lens group and the image-side lens group referred to as a 2b-th lens group,
the 2a-th lens group has a positive optical power,
the aperture stop is arranged to an object side of the 2b-th lens group,
a surface concave to the object side is arranged at a most object-side position in the 2b-th lens group, and Conditional Formula (7) below is fulfilled:

$$-5.0 \leq R2b/Ds \leq -1.0 \quad (7)$$

where
R2b represents a radius of curvature of the concave surface; and
Ds represents a distance from the aperture stop to a vertex of the concave surface along the optical axis.

16. The zoom lens system according to claim 15, wherein Conditional Formula (8) is fulfilled:

$$0.9 \leq f2a/f2 \leq 1.4 \quad (8)$$

where
f2a represents a focal length of the 2a-th lens group; and
f2 represents a focal length of the second lens group.

17. An imaging optical device comprising an image sensor for converting an optical image formed on a light-sensing surface into an electrical signal and a zoom lens system provided such that an optical image of a subject is formed on a light-sensing surface of the image sensor, wherein
the zoom lens system comprises, from an object side, a first lens group having a negative optical power, a second lens group having a positive optical power, a third lens group having a negative optical power, and a fourth lens group having a positive optical power, the zoom lens system achieving zooming by varying distances between the lens groups, wherein during zooming, at least the first to third lens groups move individually; during zooming from a wide-angle end to a telephoto end, the distance between the first and second lens groups decreases, the distance between the second and third lens groups varies, and the distance between the third and fourth lens groups increases; and Conditional Formulae (1) and (2) below are fulfilled:

$$1.0 \leq |f2/f1| \leq 1.5 \quad (1)$$

$$2.0 \leq |f4/f1| \leq 5.0 \quad (2)$$

where
f1 represents a focal length of the first lens group;
f2 represents a focal length of the second lens group; and
f4 represents a focal length of the fourth lens group.

18. The imaging optical device according to claim 17, wherein in the zoom lens system,
an aperture stop that moves together with the second lens group during zooming is provided to an object side of or within the second lens group,
a cemented lens element formed by cementing together a negative lens element having a strong concave surface on an image side and a biconvex lens element is arranged within the second lens group, to an image side of the aperture stop, and
a material of the biconvex lens element fulfills Conditional Formula (3) below:

$$\Delta PgF \geq 0.015 \quad (3)$$

where
$\Delta PgF = PgF - \alpha gF - \beta gF \times vd$;
$PgF = (ng - nF)/(nF - nC)$;
ng represents a refractive index for a g-line,
nF represents a refractive index for an F-line,
nC represents a refractive index for a C-line,
$\alpha gF = 0.6483$;
$\beta gF = -0.0018$; and
vd represents an Abbe number of the lens material.

19. A digital appliance comprising an imaging optical device so as to be additionally equipped with at least one of a function of shooting a still image of a subject and a function of shooting a moving image of a subject, wherein
the imaging optical device comprises:
an image sensor for converting an optical image formed on a light-sensing surface into an electrical signal; and
a zoom lens system provided such that an optical image of a subject is formed on a light-sensing surface of the image sensor,
the zoom lens system comprises, from an object side, a first lens group having a negative optical power, a second lens group having a positive optical power, a third lens group having a negative optical power, and a fourth lens group having a positive optical power, the zoom lens system achieving zooming by varying distances between the lens groups, wherein during zooming, at least the first to third lens groups move individually; during zooming from a wide-angle end to a telephoto end, the distance between the first and second lens groups decreases, the distance between the second and third lens groups varies, and the distance between the third and fourth lens groups increases; and Conditional Formulae (1) and (2) below are fulfilled:

$$1.0 \leq |f2/f1| \leq 1.5 \quad (1)$$

$$2.0 \leq |f4/f1| \leq 5.0 \quad (2)$$

where
f1 represents a focal length of the first lens group;
f2 represents a focal length of the second lens group; and
f4 represents a focal length of the fourth lens group.

20. The digital appliance according to claim 19, wherein in the zoom lens system,
an aperture stop that moves together with the second lens group during zooming is provided to an object side of or within the second lens group,
a cemented lens element formed by cementing together a negative lens element having a strong concave surface on an image side and a biconvex lens element is arranged within the second lens group, to an image side of the aperture stop, and
a material of the biconvex lens element fulfills Conditional Formula (3) below:

$$\Delta PgF \geq 0.015 \quad (3)$$

where
$\Delta PgF = PgF - \alpha gF - \beta gF \times vd$;
$PgF = (ng - nF)/(nF - nC)$;
ng represents a refractive index for a g-line,
nF represents a refractive index for an F-line,
nC represents a refractive index for a C-line,
$\alpha gF = 0.6483$;
$\beta gF = -0.0018$; and
vd represents an Abbe number of the lens material.

* * * * *